(12) United States Patent
Schmid et al.

(10) Patent No.: US 10,072,897 B2
(45) Date of Patent: Sep. 11, 2018

(54) HEAT EXCHANGER FOR A SHOWER OR BATHTUB

(71) Applicant: Joulia AG, Biel (CH)

(72) Inventors: Reto Schmid, Gümligen (CH); Roman Svaton, Biel (CH); Christoph Rusch, Grossaffoltern (CH)

(73) Assignee: JOULIA AG, Biel (CH)

( * ) Notice: Subject to any disclaimer, the term of this patent is extended or adjusted under 35 U.S.C. 154(b) by 32 days.

(21) Appl. No.: 15/111,380

(22) PCT Filed: Jan. 16, 2015

(86) PCT No.: PCT/CH2015/000003
§ 371 (c)(1),
(2) Date: Jul. 13, 2016

(87) PCT Pub. No.: WO2015/106362
PCT Pub. Date: Jul. 23, 2015

(65) Prior Publication Data
US 2016/0341490 A1  Nov. 24, 2016

(30) Foreign Application Priority Data

Jan. 17, 2014 (CH) ....................... 0067/14
Aug. 25, 2014 (CH) ....................... 1266/14

(51) Int. Cl.
*F24D 3/16* (2006.01)
*F28D 21/00* (2006.01)
(Continued)

(52) U.S. Cl.
CPC ..... *F28D 21/0012* (2013.01); *F24D 17/0005* (2013.01); *F28D 1/0213* (2013.01);
(Continued)

(58) Field of Classification Search
CPC .. F28D 21/0012; F28D 1/0213; F28D 1/0477; F28D 3/02; F28D 3/04;
(Continued)

(56) References Cited

U.S. PATENT DOCUMENTS 4,372,372 A * 2/1983 Hunter ................ F24D 17/0005
  165/109.1
4,398,308 A * 8/1983 Berg ........................ A47K 3/28
  165/66
(Continued)

FOREIGN PATENT DOCUMENTS

AT        395 654         2/1993
DE    10 2006 050 922     4/2008
(Continued)

*Primary Examiner* — Justin Jonaitis
(74) *Attorney, Agent, or Firm* — Rankin, Hill & Clark LLP

(57) ABSTRACT

A heat exchanger for heating fresh water using heat from wastewater in a shower or bathtub. The heat exchanger has a drain pan, a heat exchanger unit that is arranged in the drain pan, and a distributing element for distributing draining wastewater over the heat exchanger unit. The heat exchanger unit has multiple tube portions that follow one another sequentially and are connected to one another by diverting portions. Each two horizontally running tube portions that follow one another and that are thus connected by a deflecting portion are arranged one over the other, and wastewater, which is dripping or flowing down, is sprinkled on or flows over the tube portions one after the other.

21 Claims, 18 Drawing Sheets

(51) Int. Cl.
*F28F 9/26* (2006.01)
*F28D 1/047* (2006.01)
*F28D 3/02* (2006.01)
*F28F 1/00* (2006.01)
*F28D 1/02* (2006.01)
*F24D 17/00* (2006.01)
*F28D 3/04* (2006.01)
*F28F 27/02* (2006.01)
*F28D 7/08* (2006.01)
*E03C 1/00* (2006.01)

(52) U.S. Cl.
CPC .............. *F28D 1/0477* (2013.01); *F28D 3/02* (2013.01); *F28D 3/04* (2013.01); *F28F 1/003* (2013.01); *F28F 9/26* (2013.01); *F28F 27/02* (2013.01); *E03C 2001/005* (2013.01); *F24D 2200/20* (2013.01); *F24D 2220/044* (2013.01); *F28D 7/085* (2013.01); *F28F 2230/00* (2013.01); *F28F 2265/16* (2013.01); *F28F 2265/22* (2013.01); *F28F 2280/10* (2013.01); *Y02B 30/566* (2013.01)

(58) Field of Classification Search
CPC .... F28D 7/085; F24D 17/005; F24D 2200/20; F28F 1/003; F28F 9/26; F28F 27/02; F28F 2230/00; F28F 2265/22; F28F 2280/10; E03C 2001/005; Y02B 30/566; A61H 2033/068; F24H 1/0081
USPC .................................................. 165/56; 4/589
See application file for complete search history.

(56) References Cited

U.S. PATENT DOCUMENTS

| | | | |
|---|---|---|---|
| 4,821,793 A * | 4/1989 | Sheffield | A47K 3/001 165/47 |
| 2003/0024692 A1 | 2/2003 | Wu | |
| 2005/0173102 A1 | 8/2005 | Jung | |
| 2009/0218080 A1* | 9/2009 | McGregor | F28F 7/005 165/157 |
| 2010/0270009 A1 | 10/2010 | Kim | |
| 2010/0282343 A1 | 11/2010 | Simoneschi | |
| 2011/0107512 A1* | 5/2011 | Gilbert | E03C 1/00 4/596 |
| 2011/0226341 A1* | 9/2011 | Platteel | E03B 1/04 137/1 |
| 2016/0069617 A1* | 3/2016 | Gil | F28D 21/0012 165/45 |
| 2017/0198982 A1* | 7/2017 | Tornquist | F28D 21/0012 |

FOREIGN PATENT DOCUMENTS

| | | | |
|---|---|---|---|
| EP | 1 457 608 | 9/2004 | |
| EP | 2 273 223 | 1/2011 | |
| EP | 2 453 194 | 11/2011 | |
| EP | 2 453 194 | 5/2012 | |
| EP | 2453194 A1 * | 5/2012 | ............ F28D 7/024 |
| FR | 2 868 796 | 10/2005 | |
| NL | 1020068 | 8/2003 | |

* cited by examiner

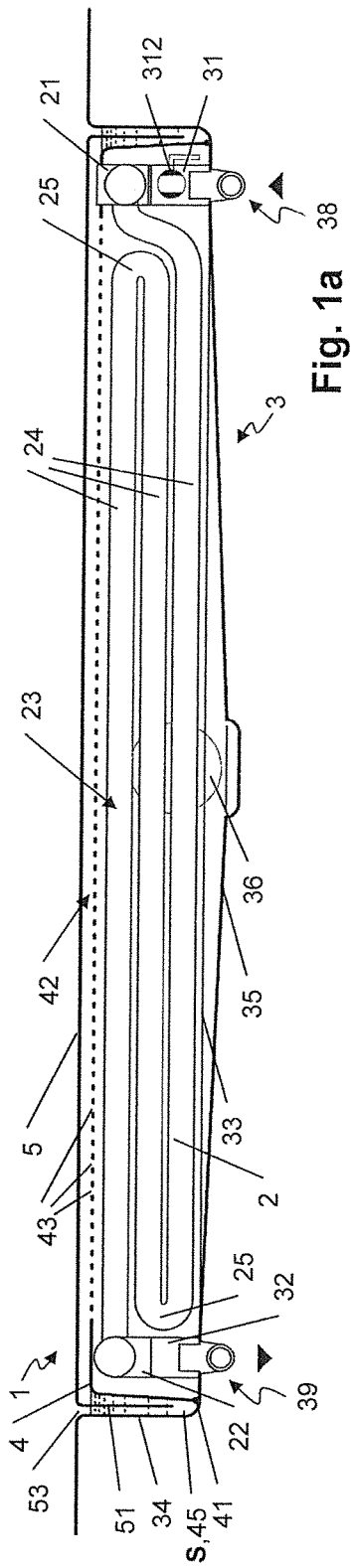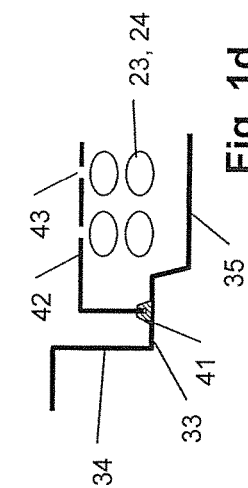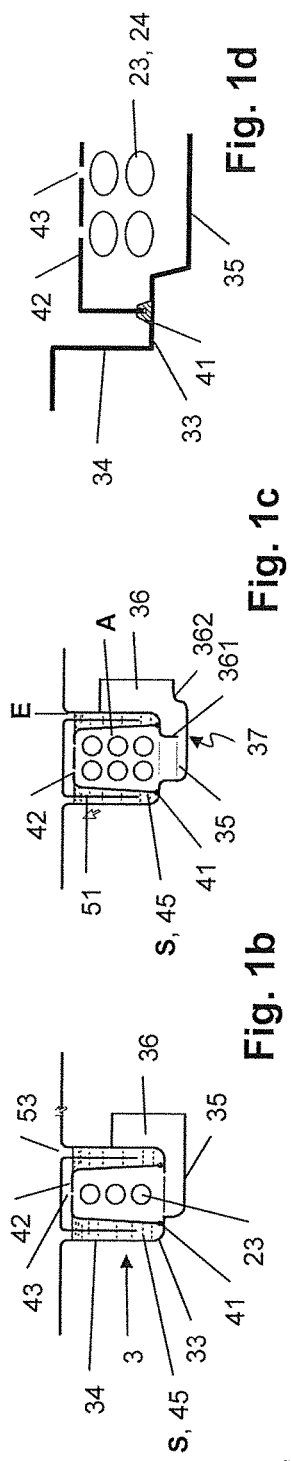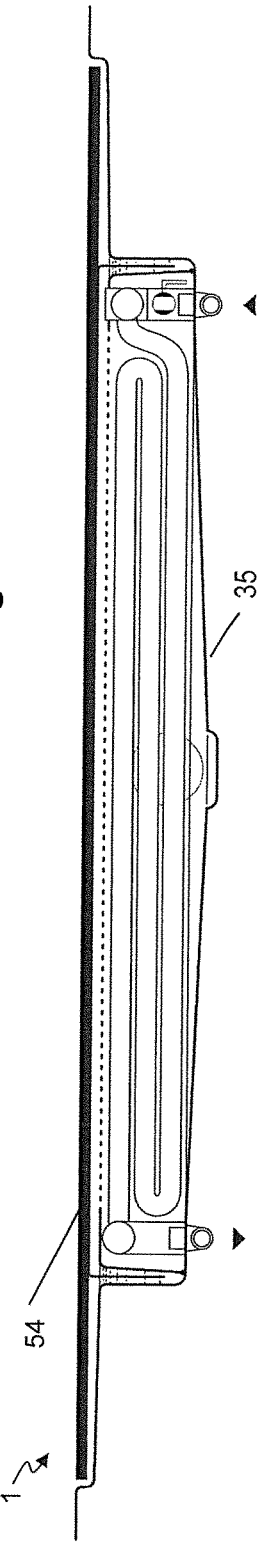

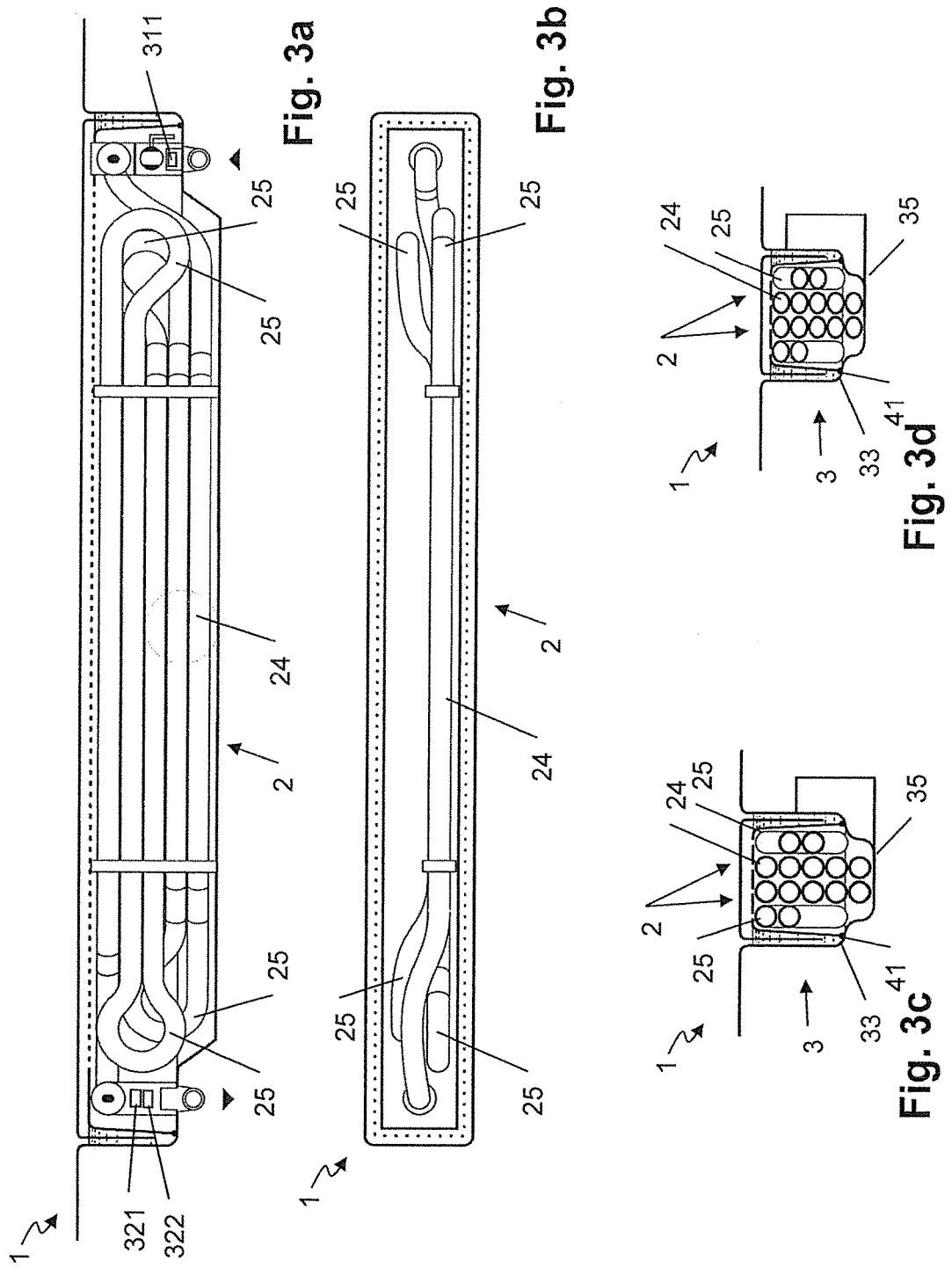

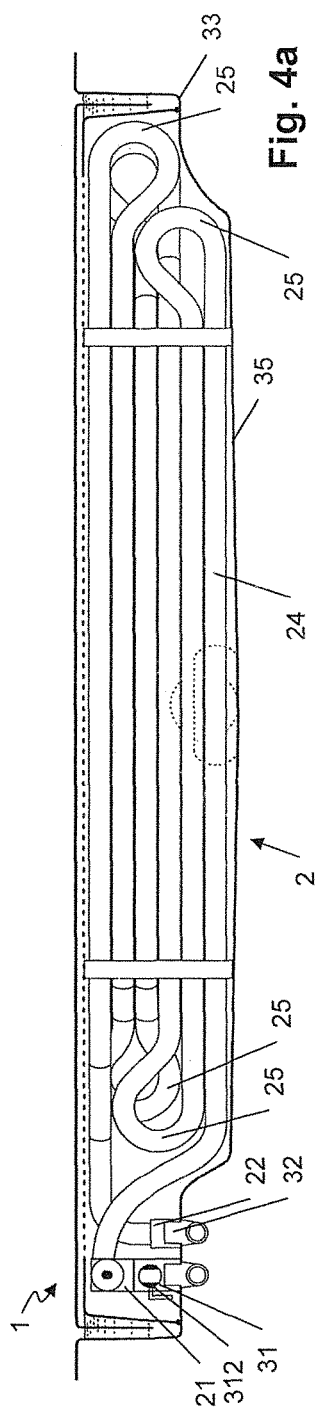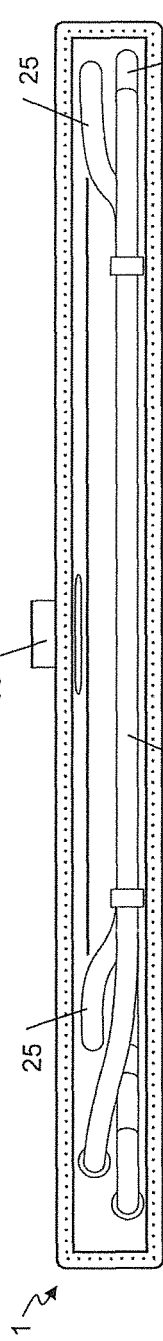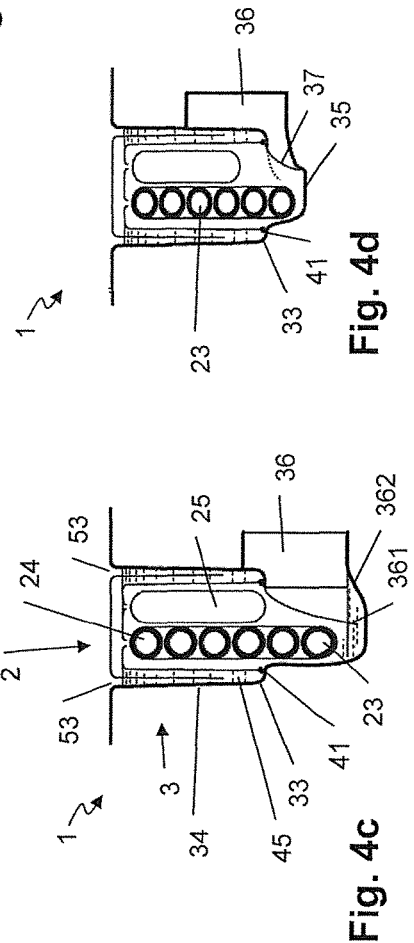

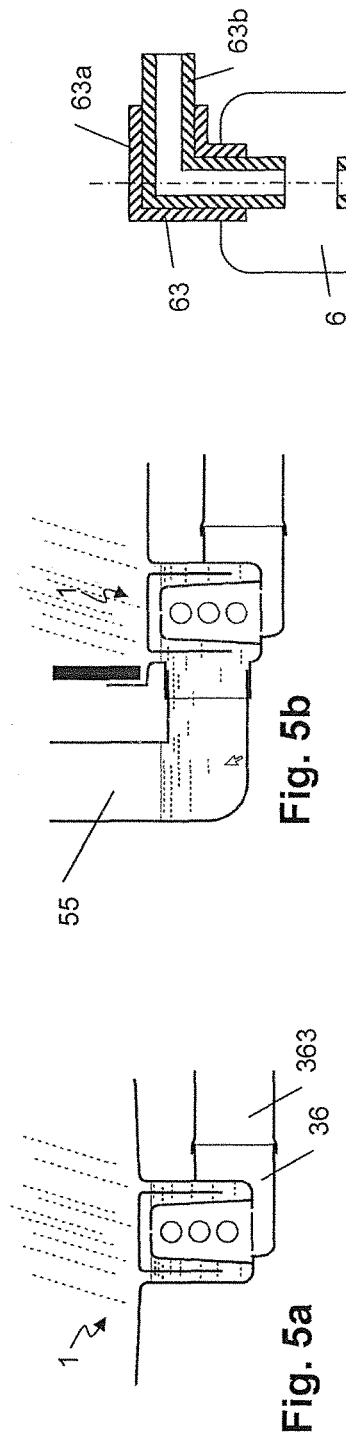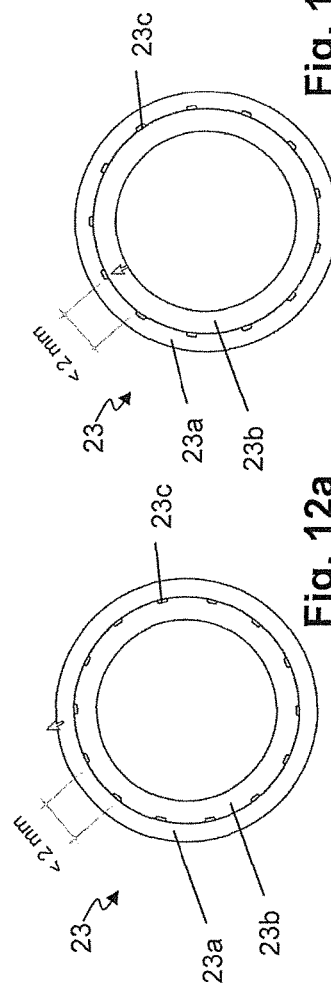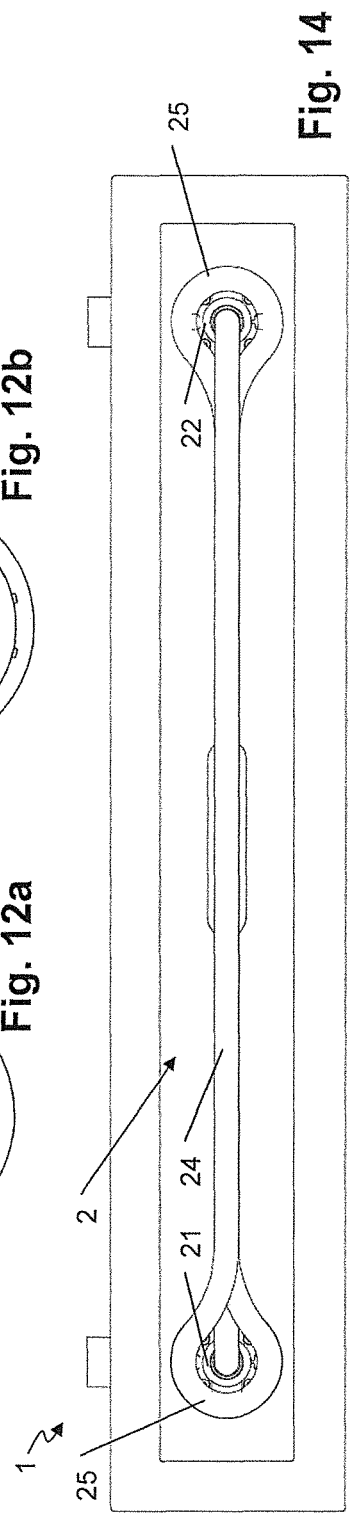

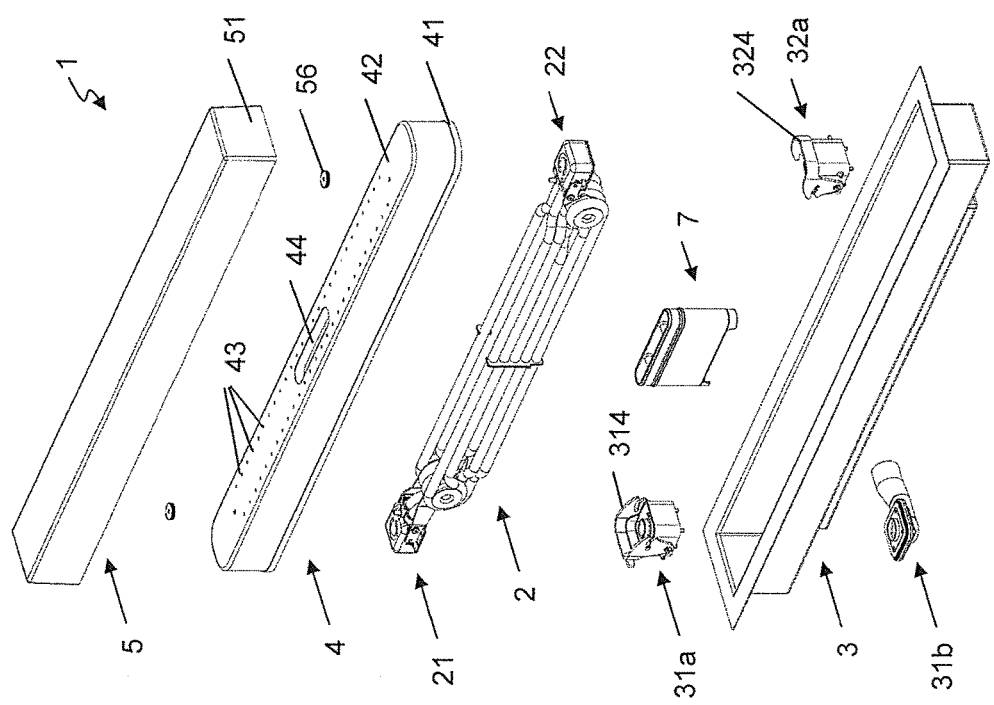
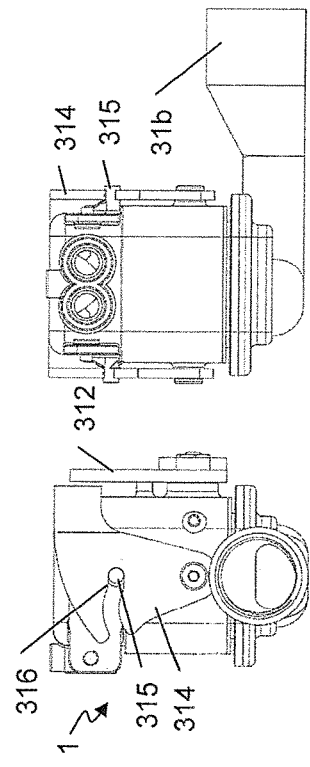
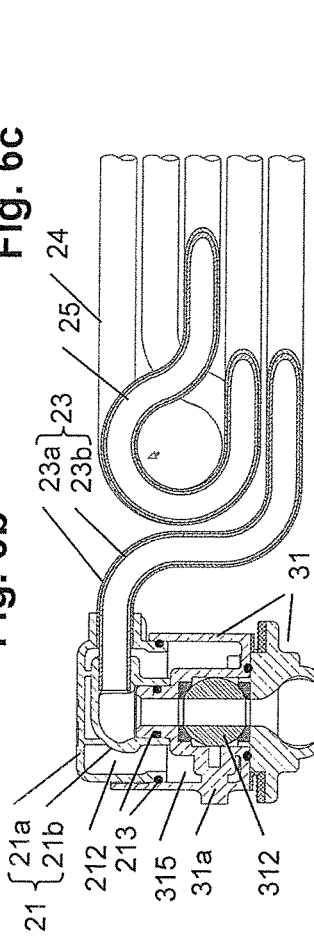
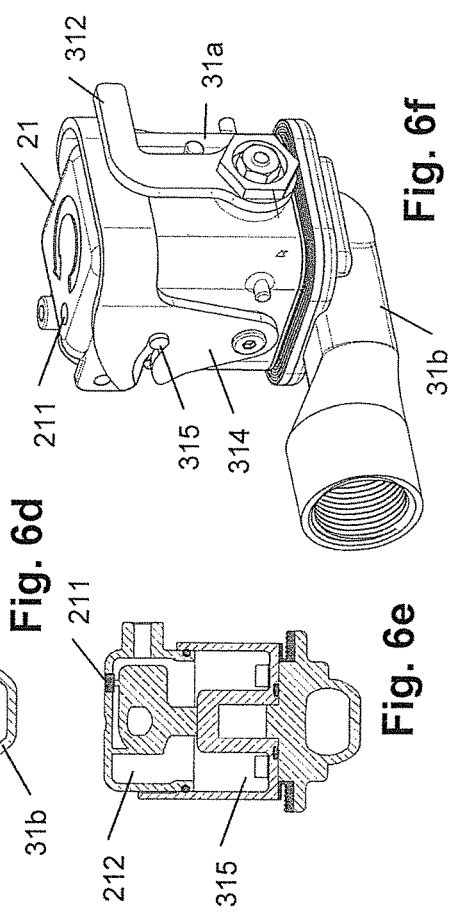

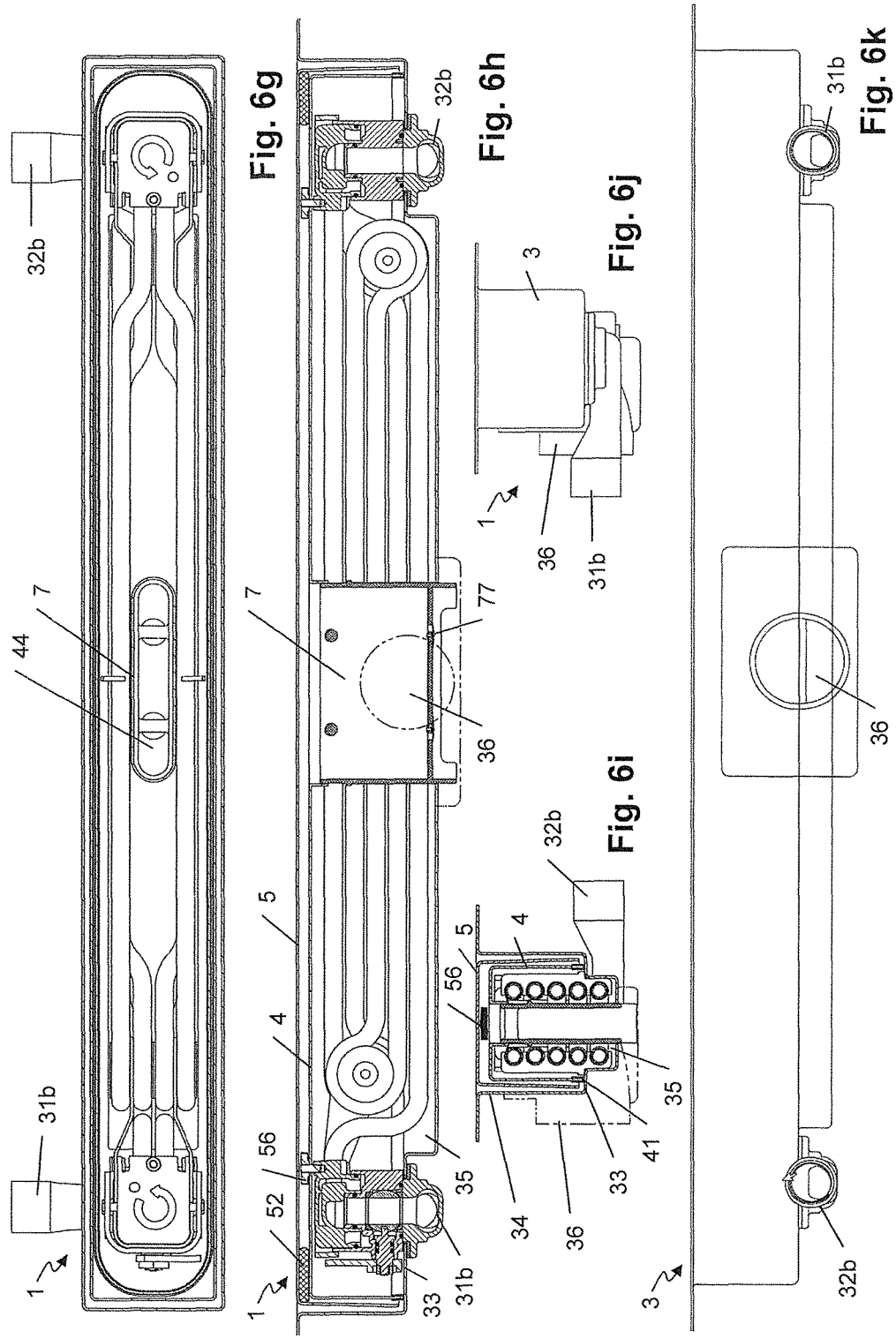

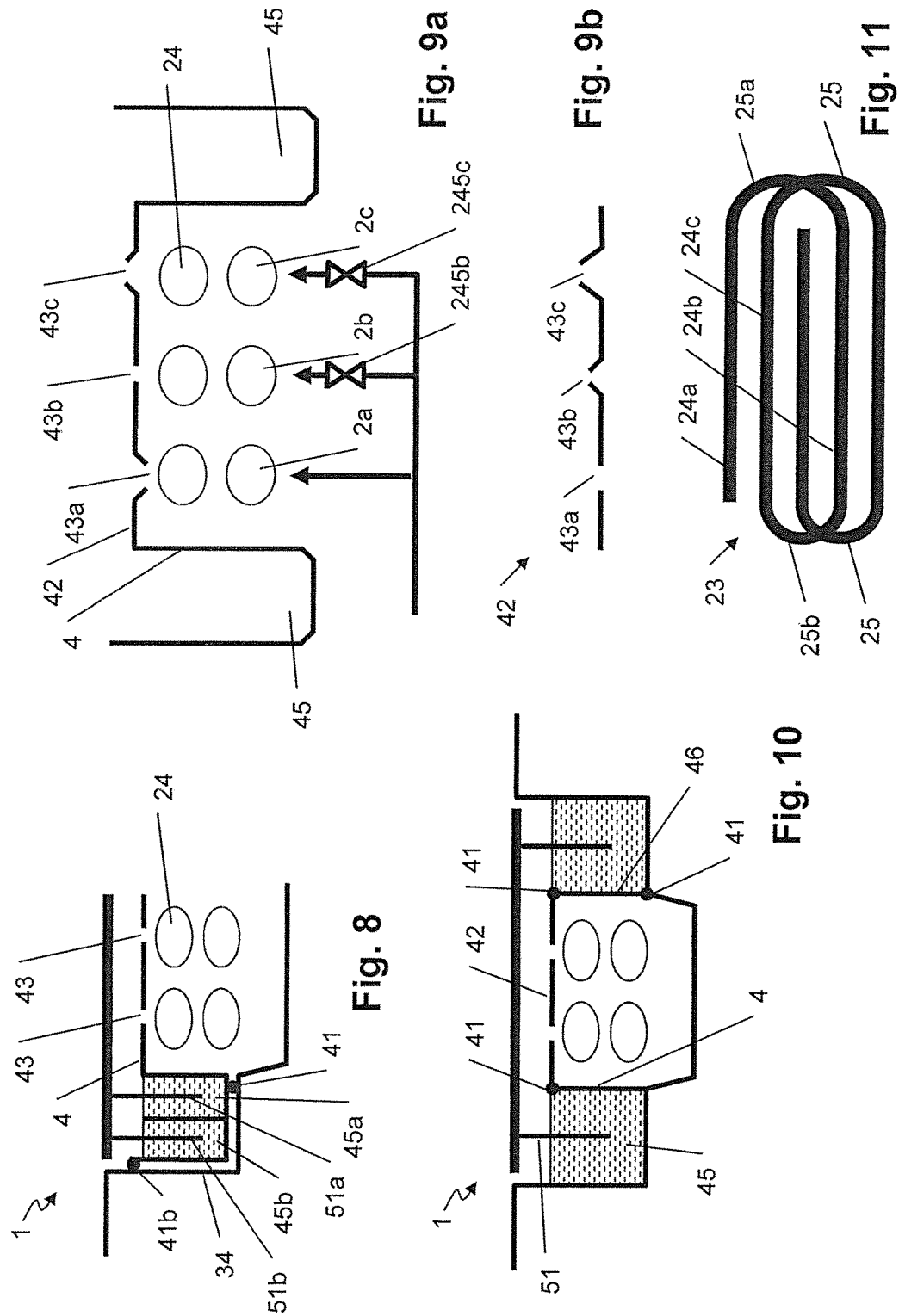

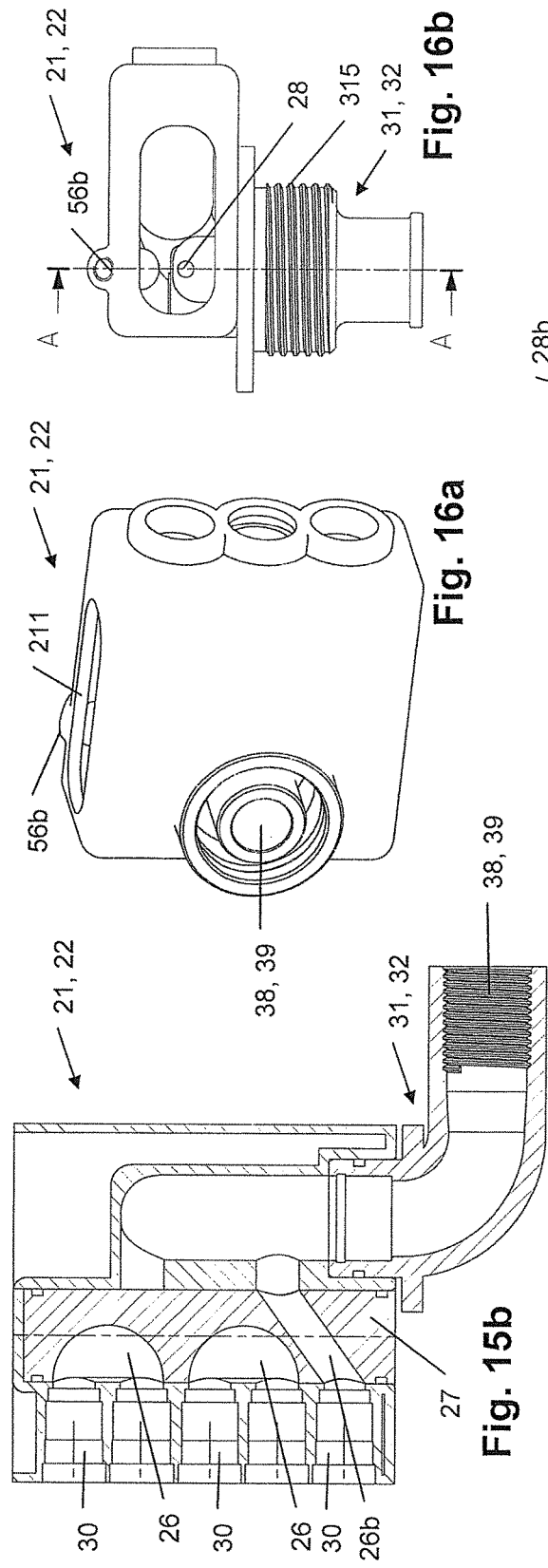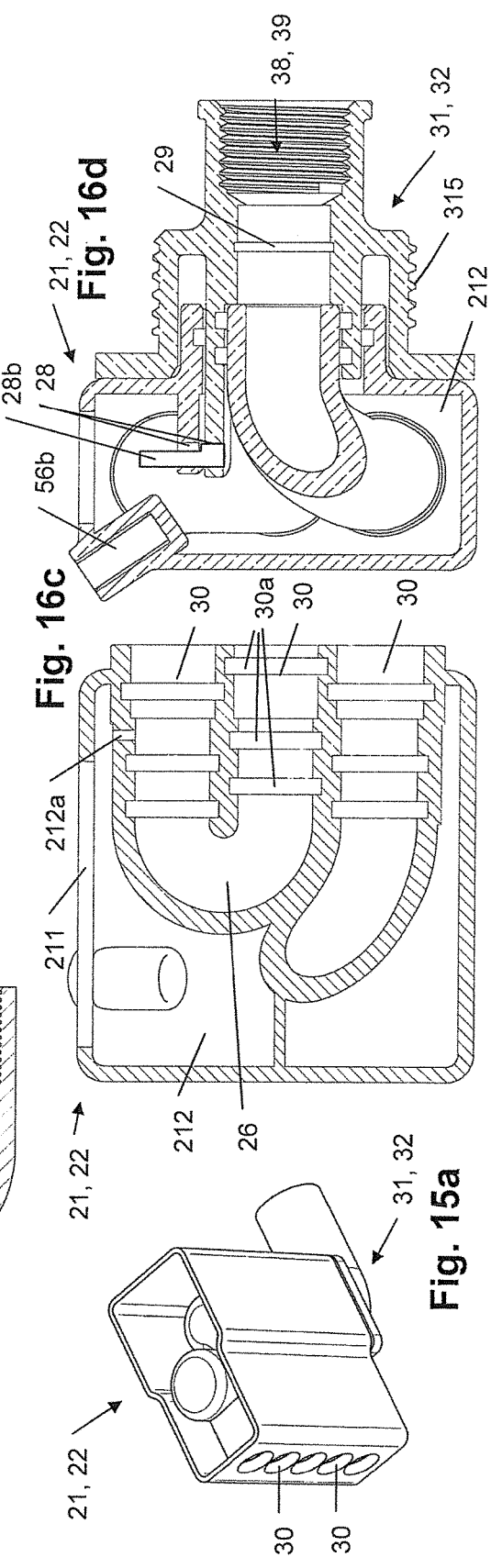

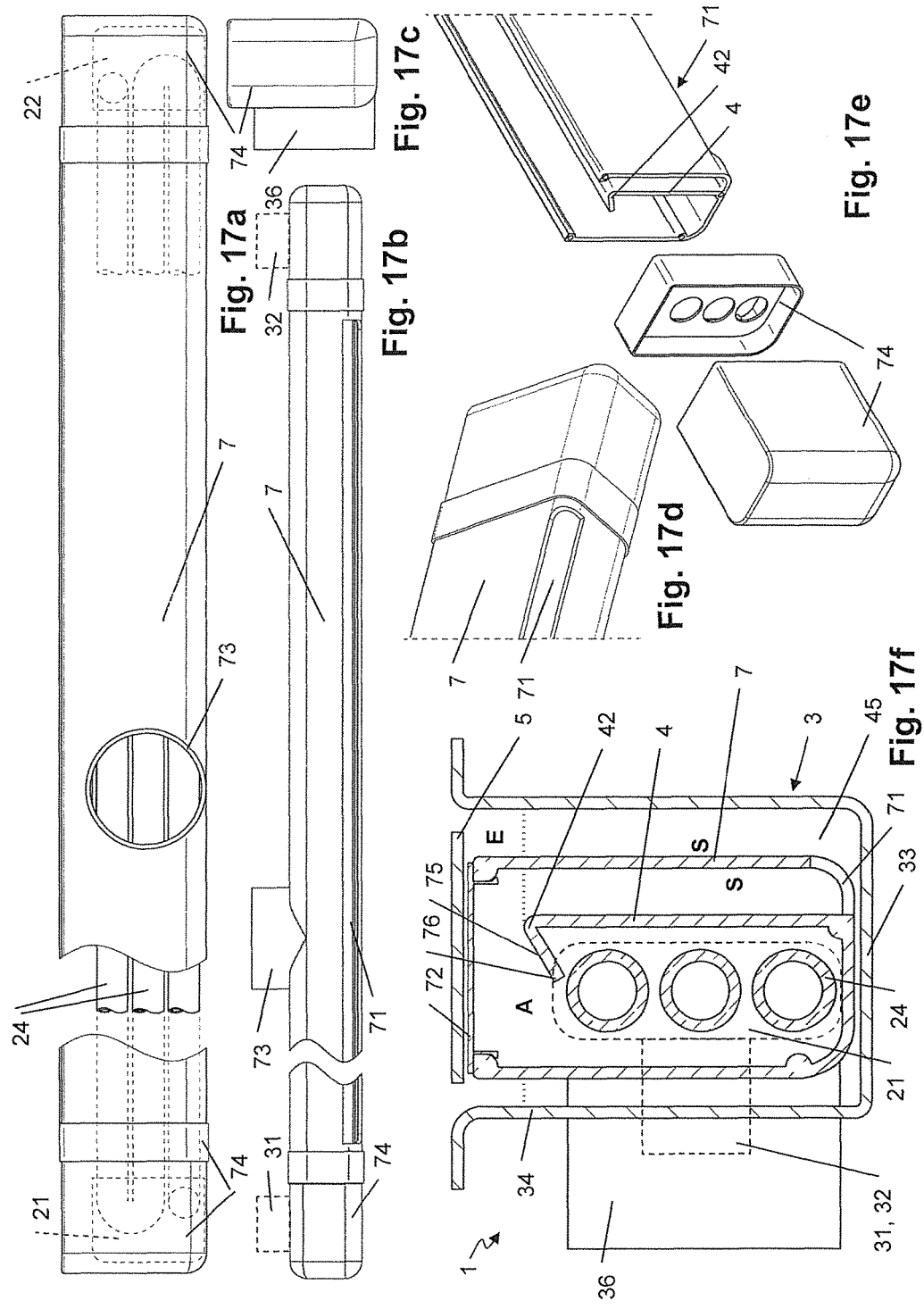

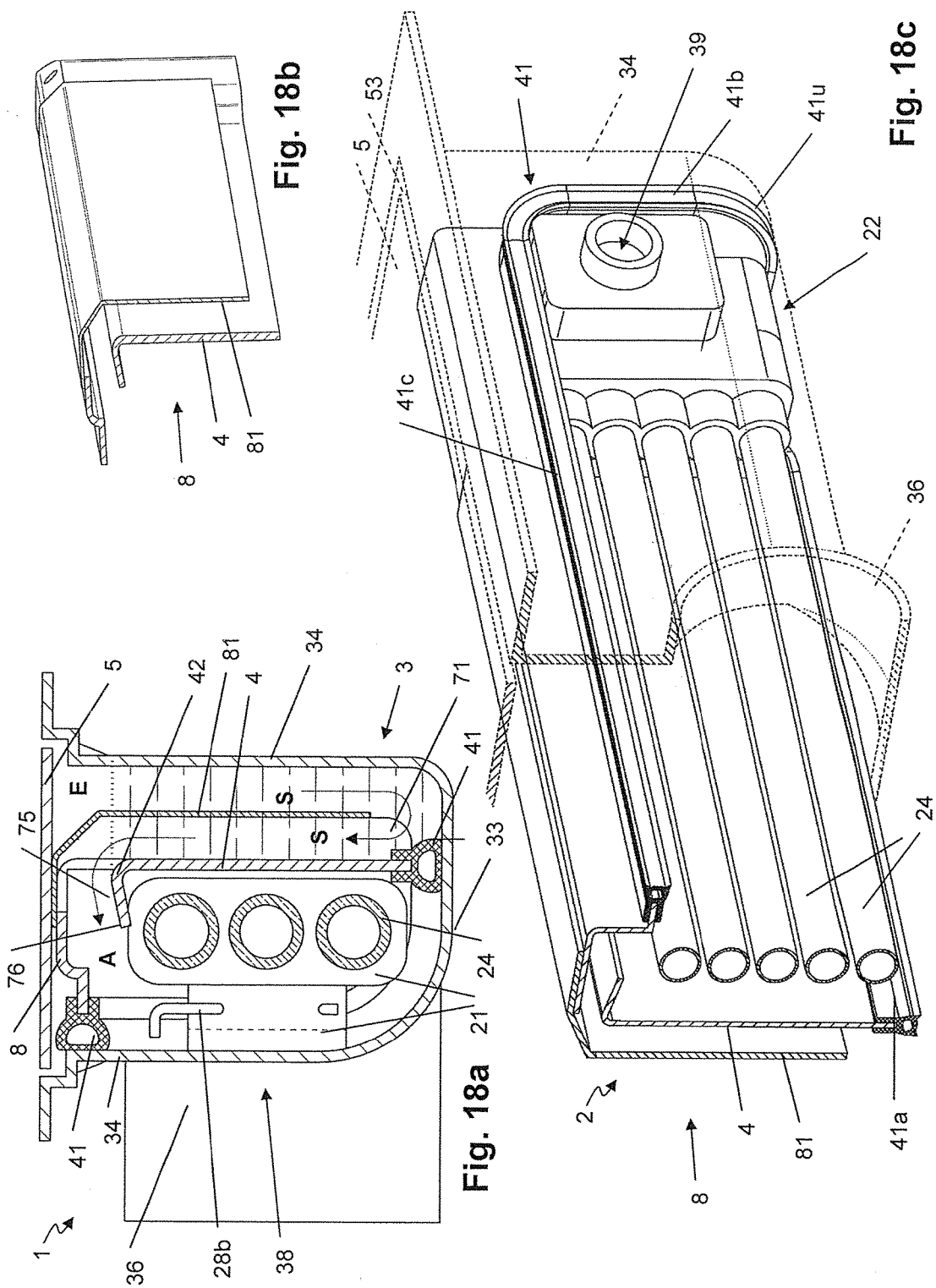

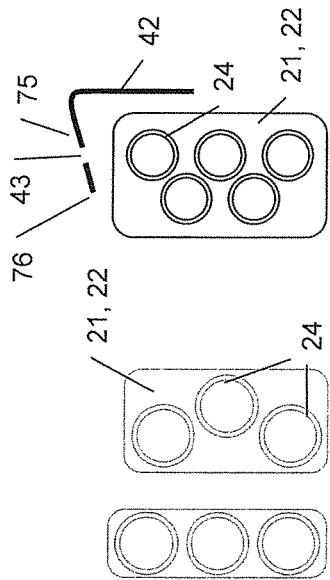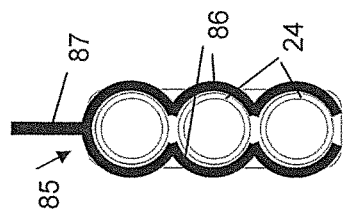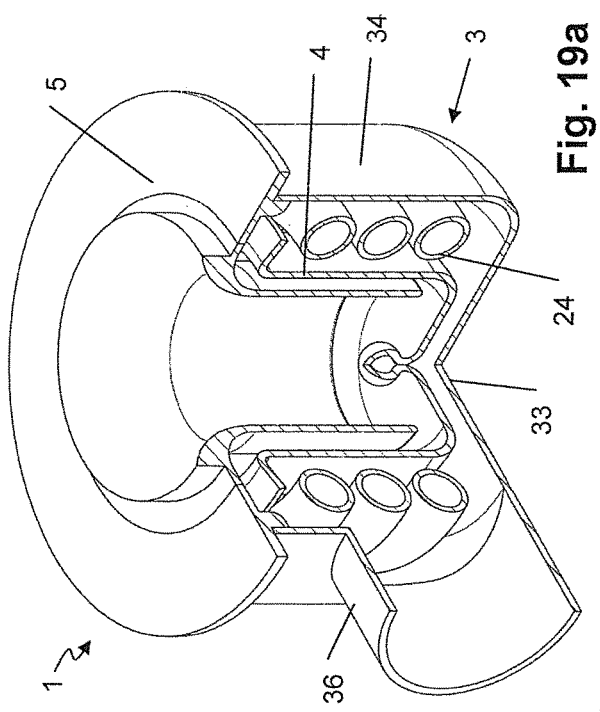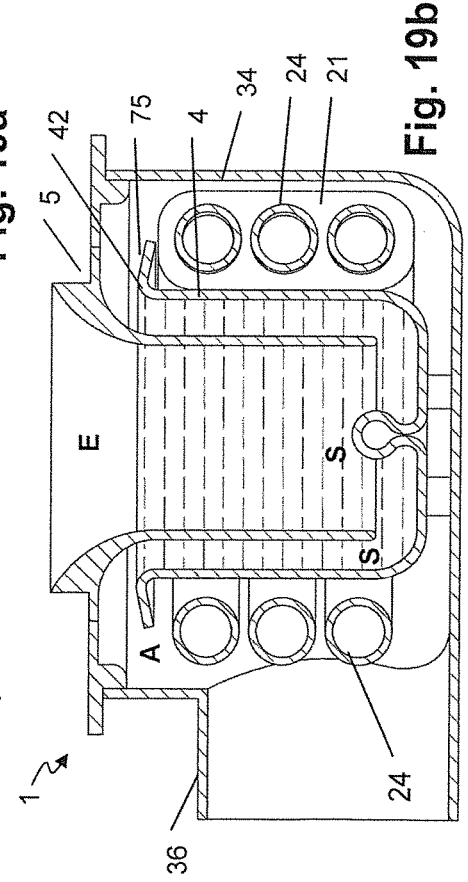

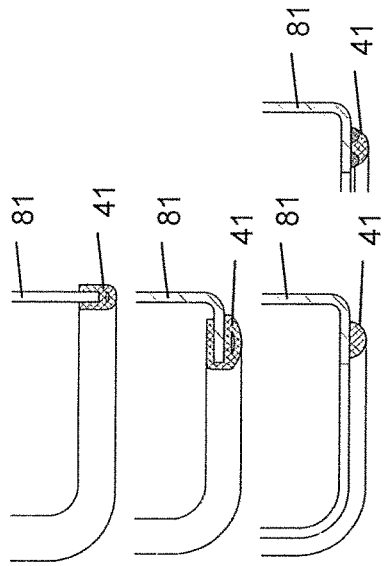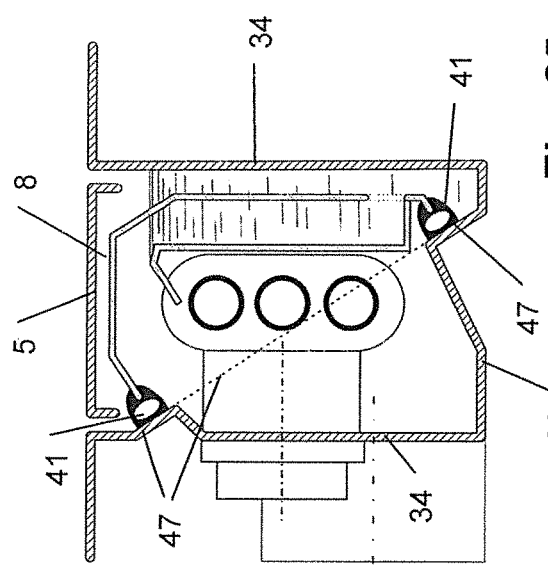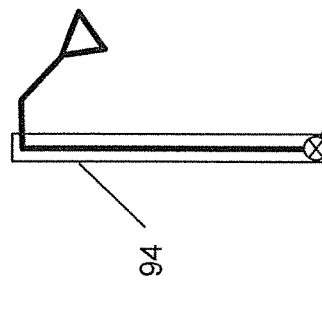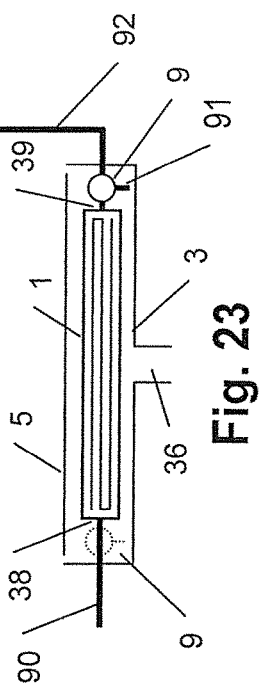

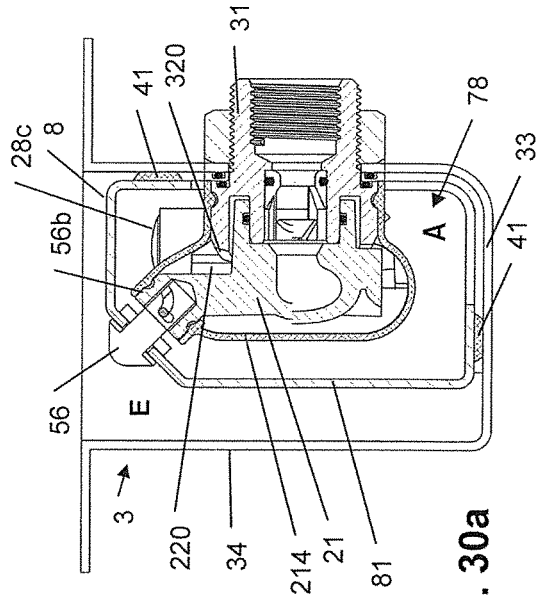
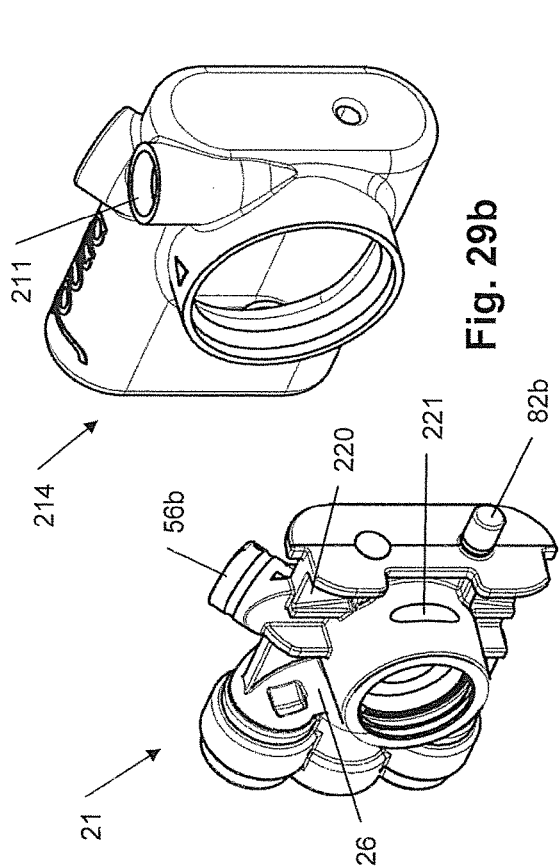
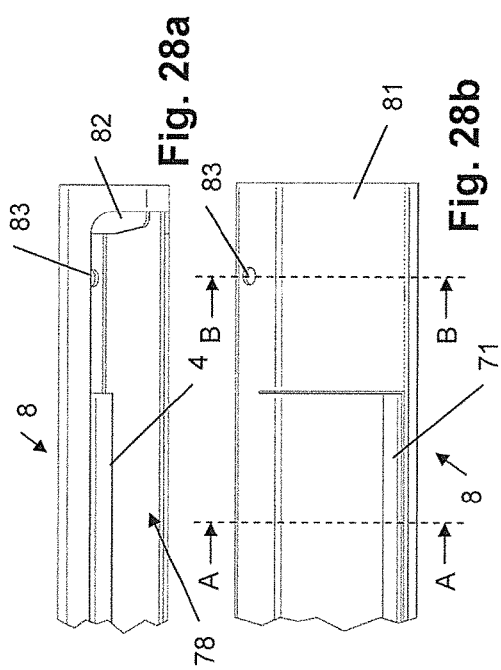
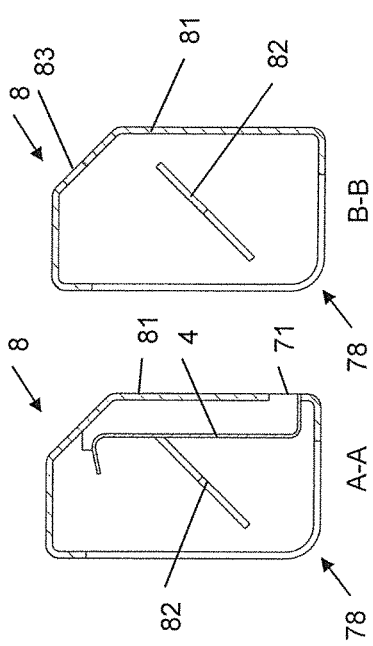

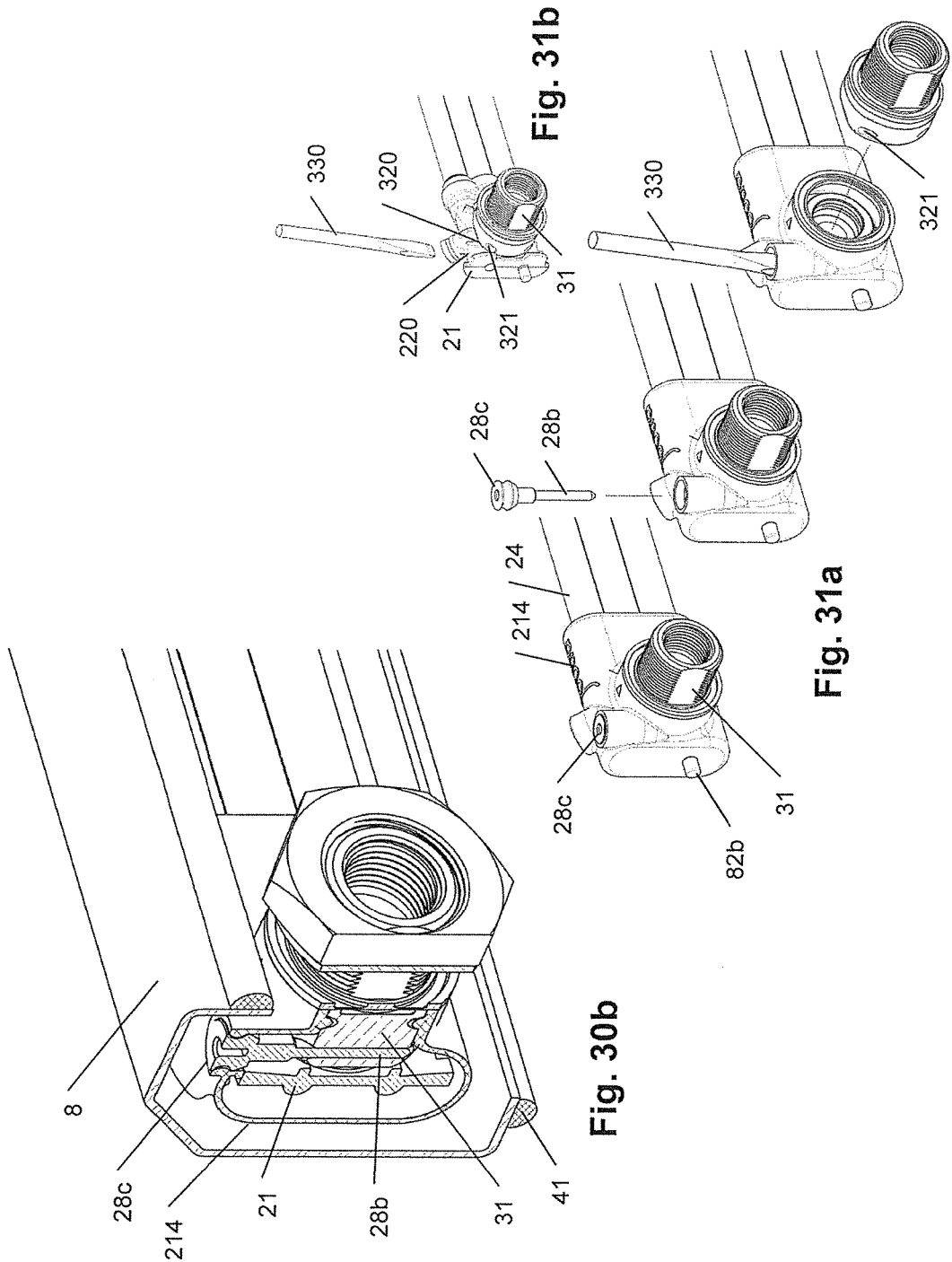

HEAT EXCHANGER FOR A SHOWER OR BATHTUB

BACKGROUND OF THE INVENTION

Field of the Invention

The present invention relates to the field of heat exchangers and, in particular, to a heat exchanger for a shower or a bath tub.

Description of Related Art

EP 2273223 A1 discloses a heat exchanger that is assembled as the drain of a shower tray and is arranged in an elongate manner along a side of the shower tray. Running-off water flows through a siphon and then essentially vertically downwards along a plane plate of a heat exchanger. Conduits for fresh water are connected to this plate, for example by ribs (fins), in order to create an intermediate space, into which waste water or fresh water flows in the case of a leakage, and the leak can be detected by way of this. The ribs (fins) have a width of 2 millimetres at the most. Running-off water firstly flows through an elongate siphon and then over a distribution plate distributing water along the heat exchanger. The siphon is arranged in an intermediate space between two heat exchangers. The distribution plate can be designed as one-piece with a wall of the siphon.

EP 2453194 A1 discloses a heat exchanger for a drain of a shower tray, in which the running-off water is led over elongate windings of a pipe with fresh water. Seen from above, the windings lie on loops with straight sections connected by semicircular sections. Running-off water firstly flows through an elongate siphon and then over a perforated plate which distributes the water above the windings over these. The siphon is arranged in an intermediate space between the windings. The distribution plate is designed as one piece with a wall of the siphon.

FR 2868796 A1 discloses a heat exchanger with a siphon arranged in the middle of a spirally running heat exchanger pipe. In another embodiment, the heat exchanger itself is arranged in a container acting as a siphon. In both embodiments, the heat exchanger pipe lies in the running-off water.

Existing heat exchangers are difficult to clean and decalcify and/or are difficult to control and service, and/or can be further improved with regard to their efficiency.

SUMMARY OF THE INVENTION

It is therefore one possible object of the invention, to create a heat exchanger having an improved efficiency.

A further possible object of the invention is to create a heat exchanger that is simple to control, to service and/or to clean or to decalcify.

A further possible object of the invention is to create a heat exchanger that is simple to assemble and/or can be used in a versatile manner.

A further possible object of the invention is to create a heat exchanger that has a high reliability concerning leakages and damage to buildings due to such leakages.

A further possible object of the invention is to create a heat exchanger that has a small construction height.

A further possible object of the invention is to create a heat exchanger that assists the hygienic operation of a shower.

According to a first aspect of the invention, which can be realised independently of the other aspects, a heat exchanger with a low construction height, but despite this, with a high efficiency is present, with the following characteristics:

A heat exchanger for heating fresh water by way of heat from waste water, at a shower or bath tub, including a drain trough, at least one heat exchanger unit that is arranged in the drain trough and is provided for the connection into a fresh water feed, and a distribution element that is arranged for distributing running-off water over the at least one heat exchanger unit. Thereby, the at least one heat exchanger unit includes several sequentially successive (thus successively subjected to throughflow) pipe sections that are connected to one another by deflection sections subjected to through-flow and that run essentially horizontally given an orientation of the heat exchanger as in operation of the heat exchanger. Thereby, in each case two horizontally running, successive pipe sections, thus ones that are connected to one another only by a deflection section, are arranged above one another and one after the other are subjected to being sprinkled or flowed over by dripping down or running down waste water.

In other words: a first pipe section leads in a first direction, and after a deflection section a second pipe section leads below the first pipe section in the opposite direction. Therefore, seen along the heat exchanger pipes (which is to say along the flow through the pipes), no further horizontally running pipe section is present between the first and the second pipe section. Considered vertically (along the flow over the pipes), the two described pipe sections as a rule are likewise successive, which is to say consecutive. Alternatively however, a different sequence can also be realised in the vertical, for example by way of a third pipe section which, considered along the pipes, is successive to the second pipe section, being arranged between the first and the second pipe section in the vertical direction.

Dripping down or running down waste water flows over or sprinkles (depending on the volume flow of the waste water) the pipes one after the other, due to the pipes of a heat exchanger unit being arranged above one another. This can also be indicated as a falling film. A new mixing in the waste water take place in each case between two pipe sections lying above one another, by which means the release of heat to the pipes is improved.

Generally it is the case: details such as "horizontal" and "vertical" relate to the orientation of the heat exchanger in the installed and operationally functioning condition. Successive pipe sections of a heat exchanger unit are arranged vertically above one another, and the pipe sections at least approximately run horizontally, in this condition.

The term "heat exchanger unit" indicates a sequence of conduits that lead fresh water, said sequence leading from a fresh water feed to a fresh water discharge, and through which sequence fresh water sequentially flows. Several heat exchanger units can be connected in parallel.

According to an embodiment, the pipe sections are arranged vertically above one another.

According to an embodiment, the pipe sections are essentially straight.

According to an embodiment, all straight sections of a heat exchanger unit run in the same vertical plane. A second heat exchanger unit can be arranged essentially parallel thereto in another vertical plane. Such an arrangement is to be differentiated from a single heat exchanger unit, whose straight pipe sections run in two or more vertical planes, for example with deflection sections that lead the pipe, which is to say the fresh water flow, from the one of these two planes to the other.

It has been found that a small construction height, but nevertheless a good efficiency can be realised with a heat exchanger designed in this manner. The construction height can be kept small by way of further measures, for example by way of the combination of one or more of the following measures:

Vertically compressed pipes, at least in the pipe sections.

Leading the feed and discharge of fresh water through a vertical side wall or trough wall instead of the trough base.

Discharge pipe-stubs to the sewage system likewise in a vertical side wall instead of the trough base.

Connection pipe-stubs for the feed and discharge of fresh water, which lead vertically downwards out of the trough base and then about an angle of 90°.

Arrangement of these connection pipe-stubs next to a recess in the trough base, wherein the recess leads to a run-off for the waste water to the sewage system.

Design of a (peripheral) siphon as a multi-stage siphon.

In one embodiment of the heat exchanger:

connection locations for the at least one heat exchanger unit are present, which permit the at least one heat exchanger unit to be removed at least partly from the drain trough, and these connection locations are arranged within the drain trough, and/or the at least one heat exchanger unit comprises a double separation with an intermediate space between the fresh water and waste water, wherein the intermediate space is located completely within the drain trough.

Such connection locations and/or a double separation in the drain trough can also be realised if the pipe sections run differently to that described above.

According to a second aspect of the invention, which can be realised independently of the other aspects, a heat exchanger with a high reliability with regard to leaking water is present, with the following characteristics:

A heat exchanger for heating fresh water by way of the heat from waste water, in the case of a shower or bath tub, including a drain trough, at least one heat exchanger unit that is arranged in the drain trough and is provided for the connection into a fresh water feed, and a distribution element that is arranged for distributing running-off waste water over at least one heat exchanger unit, wherein connection locations for the at least one heat exchanger unit are present, which permit the at least one heat exchanger unit at least partly to be removed from the drain trough, and these connection locations are arranged within the drain trough, and/or the at least one heat exchanger unit includes a double separation with an intermediate space between fresh water and waste water, wherein the intermediate space is located completely within the drain trough.

This leads to exiting fluid of leaks at the connection locations and/or leaks, which fill the intermediate space, being captured in the drain trough. The fluid is led into the sewage system through the drain trough. There is no danger of fluid leaving the heat exchanger in an uncontrolled manner and leading to damage to the building, in the case of damage to a heat exchanger unit.

Elements which standard connections and which lead into the drain trough or out of this, typically through a trough base or a trough wall, are used as interfaces to the heat exchanger. The feed and discharge of fresh water, as well as the discharge of waste water out of the drain trough can thus be realised by tested standard sanitary (plumbing) components. All parts specific to the heat exchanger are arranged in the drain trough and thus cause no damage to the building in the case of damage, in particular with leaks. The precondition is of course that a run-off (drain) or run-off pipe-stub is connected to the sewage system in a technically correct manner.

A visual control of the sealing of the heat exchanger unit is possible in a simple manner due to all fluid exiting in the case of a leak getting into the drain trough.

The connection locations can be separating locations that permit an assembly and disassembly of the at least one heat exchanger unit, in particular in a tool-free, thus purely manual manner. Such a connection location, for example, can include a holding element, such as a lever actuatable by hand or a holding ring with a bayonet closure etc. However, a connection that is releasable and can be recreated manually with a tool, for example with one or more screws, can also be present.

The connection locations can be movable connections, for example pivot elements or flexible (hose) connections that permit a pivoting-out or removal of the at least one heat exchanger unit out of the drain trough. This can be effected without an interruption of the flow of fresh water through the heat exchanger. The pivot elements can be designed in a single-walled or double-walled manner in accordance with the other elements of the heat exchanger.

In an embodiment of the heat exchanger connection locations for the at least one heat exchanger unit are present and these permit the at least one heat exchanger unit to be removed at least partly from the drain trough, and either these connection locations are releasable and reconnectable separating locations, which permit a disassembly of the at least one heat exchanger unit, or these connection locations are movable connections, which permit a pivoting-out or removal of the at least one heat exchanger unit from the drain trough.

Such connection locations can also be realised if the pipe sections run differently from that described above.

According to a third aspect of the invention, which can be realised independently of the other aspects, thus a heat exchanger that is simple to service and to clean is present, with the following characteristics:

The heat exchanger for heating fresh water by way of heat from the waste water in the case of a shower or bath tub, comprising a drain trough, at least one heat exchanger unit that is arranged in the drain trough and is provided for the connection into a fresh water feed, and a distribution element which is arranged for distributing running-off waste water over the at least one heat exchanger unit, wherein connection locations for the at least one heat exchanger unit are present, and these permit the at least one heat exchanger unit to be at least partly removed from the drain trough, and either these connection locations are releasable and reconnectable separating locations, which permit a disassembly of the at least one heat exchanger unit, or these connection locations are movable connections, which permit a pivoting-out or removal of the at least one heat exchanger unit from the drain trough.

With this, it is possible to remove the at least one heat exchanger unit out of the drain trough, for servicing, checking and/or cleaning.

In an embodiment of the heat exchanger the at least one heat exchanger unit is connected in a direct manner or via further elements, to a first and to a second connection pipe-stub, wherein the connection pipe-stubs lead into the drain trough and out of this respectively, and wherein the at least one heat exchanger unit can be assembled on the connection pipe-stubs selectively in one of two positions, which are rotated to one another by 180° about a vertical axis, and/or the connection pipe-stubs can be assembled on the drain trough selectively in one of at least two or three positions, which are each rotated by 90° to one another about a vertical axis.

Heat exchanger units and/or connection pipe-stubs that can be assembled in a different manner in such a way can also be realised if the pipe sections run differently to that described above.

According to a fourth aspect of the invention, which can be realised independently of the other aspects, thus a heat exchanger that can be assembled in a flexible or in a diverse manner is present, with the following characteristics:

A heat exchanger for heating fresh water by way of heat from waste water, in the case of a shower or bath tub, including a drain trough, at least one heat exchanger unit that is arranged in the drain trough and is provided for connection into a fresh water feed, and a distribution element that is arranged for distributing running-off waste water over the at least one heat exchanger unit, wherein the at least one heat exchanger unit is connected to a first and second connection pipe-stub in a direct manner or via further elements, wherein the connection pipe-stubs lead into the drain trough or and out of this respectively, wherein the at least one heat exchanger unit can be assembled onto the connection pipe-stub selectively in one of two positions, which are rotated by 180° to one another about a vertical axis, and/or the connection pipe-stubs can be assembled on the drain trough selectively in one of at least two or three positions, which are each rotated by 90° to one another about a vertical axis.

The drain trough itself can be shaped essentially symmetrically, but with a run-off (drain) or run-off pipe-stub which is led out laterally. The drain trough then can then be assembled selectively in one of two positions, which are rotated by 180° to one another about a vertical axis, on assembly of the drain trough, on assembly of the drain trough, for example in a shower. The orientation of the run-off pipe-stub can be adapted to the local conditions by way of this. The orientation of the connection pipe-stub can likewise be adapted to the local conditions as described above.

If the heat exchanger unit itself can likewise be assembled in two orientations, then the feed and discharge of the fresh water can be arbitrarily connected to the drain trough. On assembly of the heat exchanger unit(s) or connection pieces, which within the drain trough can lead to the heat exchanger unit(s), then the orientation of these can be selected accordingly. The assembly is greatly simplified by way of this, and no errors can result due to a wrongly rotated installation of the drain trough. Errors in the case of a wrongly rotated installation of a heat exchanger unit can be simply corrected.

According to a fifth aspect of the invention, which can be realised independently of the other aspects, a heat exchanger with a small construction height is present, with the following characteristics:

A heat exchanger for heating fresh water by way of heat from waste water in the case of a shower or bath tub, including a drain trough, the least one heat exchanger unit that is arranged in the drain trough and is provided for the connection to a fresh water feed, and a distribution element that is arranged for distributing running-off water over the at least one heat exchanger unit, wherein the at least one heat exchanger unit comprises several sequentially successive pipe sections, which are connected to one another by deflection sections and wherein a run-in region, a siphon region and a run-off region are arranged in the drain trough, through which regions waste water flows one after the other and in this sequence, on operation of the heat exchanger, wherein the run-in region is in air exchange with the surroundings above the heat exchanger, the run-off region is in air exchange with a run-off pipe-stub provided for connection to a sewage system, and the siphon region prevents air exchange between the run-in region and run-off region and permits the flow of fluid from the run-in region to the run-off region, the siphon region (considered along a horizontal direction) at a first side is delimited by a trough wall and at a second side by a damming element, the damming element holds back running-off waste water, so that it flows over a distribution element, which distributes the waste water over the at least one heat exchanger unit.

In an embodiment, the siphon region (considered along a horizontal direction) is arranged at a first side of the heat exchanger unit, and the run-off region is arranged at a second side of the heat exchanger unit, which is opposite to the first side. A space-saving and material-saving siphon is realised by way of this.

In an embodiment, the fresh water feed and a fresh water discharge of the heat exchanger unit are led through a trough wall at the second side of the heat exchanger unit. A heat exchanger with a small construction height can be realised with this.

In an embodiment, the fresh water feed and the fresh water discharge are led through releasable pipe connections, which are arranged within the drain trough, and these pipe connections in particular can be created or disconnected by way of a horizontal movement of the heat exchanger unit. With this, the heat exchanger unit can be disassembled by a horizontal movement and can be removed out of the drain trough by way of a subsequent vertical movement.

In an embodiment, the fresh water feed and the fresh water discharge are led through releasable pipe connections arranged within the drain trough, and these pipe connections can be created or disconnected by way of a vertical movement of the heat exchanger unit. The heat exchanger unit can be disassembled by way of a vertical movement and be removed from the drain trough by way of this. The connection pipe-stub for the connection of the connection pieces can thereby be led through the trough base, or through a trough wall, and can then be angularly bent upwards, so that the connection pieces can be inserted and removed, respectively into and out of the connection pipe-stubs, from above.

In an embodiment, the fresh water feed and the fresh water discharge are led through releasable pipe connections, which are arranged within the drain trough, and in particular these pipe connections can be created or disconnected by way of a diagonal movement of the heat exchanger unit. Thereby, a movement direction for disconnecting or creating the pipe connections runs at an angle of between 30° and 60° and in particular of about 45° to the horizontal (in an installed condition of the heat exchanger).

In an embodiment, the pipe sections of the heat exchanger unit form precisely one set of pipe sections that are arranged above one another and over which dripping-down or running-down waste water trickles or flows one after the other. A heat exchanger unit that saves space particularly in the horizontal direction can be realised by way of this.

In an embodiment, the pipe sections are arranged above one another and offset to one another in the horizontal direction. Thereby, they can be subjected to throughflow one after the other considered along a vertical direction. For example, a first series of pipe sections lying essentially vertically above one another, and a second series of pipe sections lying essentially vertically above one another are present, wherein the first and second series are offset to one another in the horizontal direction.

In an embodiment, the siphon region is sealed with respect to the run-off region by way of a seal that is arranged between the trough base and the damming element. This seal prevents fluid from flowing away out of the siphon region into the run-off region.

In an embodiment, the run-in region is sealed with respect to the run-off region by a seal that is arranged between the trough wall and a damming cover, wherein the damming cover prevents air from getting from the run-off region into the run-in region. This seal can be formed as one piece with a seal for sealing with respect to the trough base. It can alternatively also be formed as a separate seal.

In an embodiment, the peripheral seal between the damming cover and the drain trough runs in or along a plane. This plane can be inclined with respect to the horizontal, in particular by an angle between 20° and 80° and for example between 30° and 70°. Alternatively, this plane of the seal can run in the vertical, this at an angle of 90° to the horizontal. The seal is pressed against a trough wall in this case.

In an embodiment and according to a further aspect of the invention, the seal is a multi-layered foamed seal. Seen in cross section, the seal includes at least two first sealing beads that are spaced from one another and between which a second sealing bead runs and is supported by the first sealing beads. For manufacturing the multi-layered foamed seal, firstly two first sealing beads, which run next to one another and at an essentially constant distance to one another, are deposited on a carrier object. The two first sealing beads are partly or fully cured (solidified). A further sealing bead is subsequently deposited between and/or onto the two first sealing beads and cured. The two first sealing beads stabilise the further sealing bead, so that the material of this further sealing bead does not run on the carrier object when being applied. A sealing that is improved and more stable than if one were to apply or deposit a sealing bead in a single working step, can be created by way of this. In an embodiment, the further sealing bead is of a material, which is different from the two first sealing beads, in particular of a material that is softer in the cured condition. A stable, but nevertheless compliant seal can be realised by way of this. Such a multi-layer seal can also be realised for other applications, completely independently of the applications for the heat exchanger and the waste water troughs disclosed here.

According to a sixth aspect of the invention, which can be realised independently of the other aspects, a heat exchanger is present that assists in the hygienic operation of a shower, with the following characteristics:

A heat exchanger for heating fresh water by way of the heat from waste water in the case of a shower or bath tub, including a drain trough, at least one heat exchanger unit that is arranged in the drain trough and is provided for the connection into a fresh water feed, wherein a fresh water conduit leads through the heat exchanger, and a discharge valve is arranged before or after the heat exchanger, in the fresh water conduit, said discharge valve permitting an emptying of a section in the fresh water conduit into the drain trough. This section, for example, also includes a feed to a shower head or to a tap.

The discharge valve is automatically or manually actuatable. Stagnant water at temperatures at which germs such as *legionella* bacteria can proliferate, is prevented by way of the mentioned section of the fresh water conduit being emptied.

All the aspects of the invention described above can be combined with the embodiments and features described hereinafter, in an arbitrary manner (except for cases where an embodiment is a non-compatible alternative to an aspect).

In an embodiment, the deflection sections are formed by bent pipes, and a bending diameter in the deflection sections is larger than a vertical distance between two consecutive pipe sections.

In an embodiment, a deflection section between consecutive straight pipe sections, at least in sections runs outside the plane, in which the two straight pipe sections lie.

For example, the deflection section at least in sections can run in a plane that lies outside the plane, in which the two straight pipe sections lie.

In an embodiment, the deflection section at least in sections runs in a plane lying parallel to the plane, in which the two straight pipe sections lie and is distanced to this plane.

The pipe (in this sequence) can thus for example comprise a first, second, third and fourth pipe section, and a first deflection section between the first and the second pipe section, a second deflection section between the second and the third pipe section and a third deflection section between the third and the fourth pipe section. Thereby, the first and the third deflection section are at least partly overlapping, in a projection onto the plane, in which the pipe sections run. The first and the third section can be led past one another due to the fact that they thereby run in different planes, at least in sections.

In an embodiment, the heat exchanger unit is connected to a first connection piece for feeding fresh water and to a second connection piece for the discharge of fresh water, and the drain trough includes a first and a second connection pipe-stub that, respectively, lead into and out of the drain trough, and the first connection piece is releasably assembled on the first connection pipe-stub, and the second connection piece on the section connection pipe-stub.

The two connection pieces and accordingly also the connection pipe-stubs can both be arranged on the same side of the heat exchanger, or on opposite sides, or in a region in the middle of the heat exchanger. If they are arranged on the same side, then an even number of pipe sections is present in a heat exchanger unit. If they are arranged on opposite sides, then an odd number is present. If they are arranged in a region in the middle, then two heat exchanger units extending in opposite directions can be connected on the connection pieces.

In an embodiment, the connection pieces can be assembled and disassembled manually, in particular without a tool, thus in a purely manual manner. In another embodiment, the connection pieces can be releasably assembled on the connection pipe-stubs by way of screws.

In an embodiment, the first connection pipe-stub comprises a shut-off valve for interrupting the feed of fresh water.

In an embodiment, at least one of the connection pieces is assembled on the corresponding connection pipe-stub by way of a pivotable closure lever.

A secure, which is to say reliable, watertight and vibrationally resistant connection can be realised by way of this. The closure lever can be snapping. The closure lever can be shaped such that one or more of the elements arranged thereabove (distribution element and/or damming element, e.g. realised as a drip plate, cover or cover plate) can only be completely and correctly inserted or applied, when the closure lever is in an end position in the connected condition of the respective connection piece. For this, the respective element, for example the distribution element or damming element can include elements that project inwards and collide with the closure lever when this is not in the mentioned end position.

In an embodiment, at least one of the closure levers presses the respective connection piece away from the respective connection pipe-stub on opening.

With this, it is possible to overcome the holding force of the connection between the connection piece and the connection pipe-stub, without risk of the connection piece being pulled too far with a sudden release of the connection and thereby of the heat exchanger unit(s) being bent or twisted, which is the case with a manual pulling-way.

The closure lever can be assembled on the connection pipe-stub, in particular in a rotatable manner, wherein at least one corresponding pressing element is arranged on the connection piece. On closing the closure lever, the pressing element is engaged by the closure lever, and the connection piece is thus pulled against the connection pipe-stub. Conversely, the closure lever can also be assembled on the connection piece, in particular in a rotatable manner, and accordingly the corresponding pressing element can be arranged on the connection pipe-stub. The manner of functioning on closure and opening is analogous.

In an embodiment, the closure lever includes at least one locking element that blocks or renders more difficult an opening movement of the closure lever when a force acts between the connection piece and the connection pipe-stub, the force driving these apart. With this, one can prevent the closure lever from being inadvertently opened, as long as the at least one heat exchanger unit is under pressure (of the fresh water). The locking element, for example, can be realised by way of a contact surface of the closure lever that interacts with a corresponding pressing element, having a curvature or a discontinuity or a detent.

In an embodiment
  at least one of the closure levers is mechanically coupled to the shut-off valve and closes the shut-off valve on opening the closure lever,
  or the shut-off valve in its opened position blocks an opening movement of one of the closure levers, and the shut-off valve in its closed position releases this opening movement.

Unintended showers when disassembling the heat exchanger unit are avoided by way of this.

Sensors for measuring an entry temperature, an exit temperature and/or a flowmeter for the fresh water can be arranged on the connection pipe-stubs. Moreover, a sensor for a waste water temperature can be present. An efficiency of the device can be at least approximately determined with this, and be transmitted or displayed to a user.

Filter elements can be arranged on the connection pipe-stubs or the connection pieces, in particular on those for the fresh water feed. Back-flow blockers, for example check valves can also be arranged there, in particular in the fresh water feed.

In an embodiment, at least one of the two connection pipe-stubs leads in the vertical direction through a trough base of the drain trough and is designed as an angled piece for example with an angle of 90° for the horizontal connection of a fresh water feed or a fresh water discharge.

In an embodiment, the connection pipe-stubs are rotatable or can be assembled in different positions, which are rotated to one another in each case by 90° about a vertical axis. Due to this, the orientation of the connection pipe-stubs can be adapted very simply to the local conditions on assembly of the heat exchanger by way of this, depending on the direction, from which the conduits for the fresh water are led up to the heat exchanger.

In an embodiment, the trough base includes a recess that leads running-off waste water to at least one run-off pipe-stub for connection to a sewage system, and the connection pipe-stub or stubs are arranged in a region next to the recess.

In one embodiment, a section of the connection pipe-stub projects into the connection piece. This section of the connection pipe-stub can be fixed to a corresponding element in the inside of the connection piece by way of this. Again, the connection between the connection pipe-stub and the connection piece is prevented from being pulled out by way of this. The inside of the connection piece can be accessible through an opening, which can be open or be closed with a transparent or non-transparent cover.

A trough odour trap can be arranged between the recess and the run-off pipe-stub. The trough odour trap can be realised by a vertical wall section, which blocks an upper region of the run-off pipe-stub, and by way of a connecting region of the run-off pipe-stub including a prominence which dams running-off waste water at least up to the height of a lower edge of the mentioned wall section.

Alternatively or additionally, the run-of pipe-stub can also include a closure element or run-off block, with which the run-off can be closed.

With this, it is possible to close the run-off, to fill the drain trough with water and a cleaning agent and to let the cleaning agent act, for cleaning the heat exchanger.

In an embodiment, a heat exchanger unit or a set of heat exchanger units is assembled in the drain trough in a movable manner and can be moved out of the drain trough without any interruption of the fresh water feed leading through the heat exchanger, in particular by way of a pivot movement about a pivot axis.

With this, it is possible to clean the heat exchanger with fresh water, for example by way of a shower head fed by the heat exchanger, also in the pivoted out condition, due to the fact that the fresh water supply is not interrupted.

In an embodiment, a connection unit is present, in particular a pivot unit with a first rotatable connection for the fresh water feed to at least one heat exchanger unit and with a second rotatable connection for the fresh water discharge from the at least one heat exchanger unit, wherein the two rotatable connections are rotatingly arranged about a common pivot axis.

The pivot axis can run horizontally. The pivot movement of the at least one heat exchanger unit then runs in a vertical plane.

The pivot axis can run at an angle to the horizontal, for example at an angle of at least 5°, 10° or 20° to the horizontal. The pivot movement of the at least one heat exchanger unit then runs in a plane that runs about a corresponding angle to the vertical. In this manner, one can avoid the at least one heat exchanger unit colliding with fixedly installed sanitary elements, for example a shower rod, when being pivoted out.

The at least one heat exchanger unit that can be pivoted out can be mechanically coupled to a further element, which is likewise pivotable, for example to a cover and/or to a distribution element. The coupling can be a scissor mechanism. It has the effect that the heat exchanger is likewise pivoted out when pivoting out the further element.

In an embodiment, a double-walled separation between regions leading fresh water and regions leading waste water, by way of an intermediate space is present, wherein the pipe sections are formed by double-wall pipes, and wherein double-walled connection pieces and optionally also double-walled connection pipe-stubs are present, and an intermediate space of the connection pieces is connected to an intermediate space of the double-wall pipes.

The connection pieces and optionally also the connection pipe-stubs can thus be designed in a double-walled manner, for example with an inner and with an outer wall, which are connected to one another by way of ribs (fins). The connection pipe-stubs can also be formed in a double-walled manner in the same way, at least in the region which lies within the drain trough and can thus come into contact with waste water. The intermediate spaces of the connection piece are then connected to those of the connection pipe-stub, on connecting the connection piece to a connection pipe-stub.

According to an embodiment, at least one of the connection pieces includes one or more deflection elements, in each case corresponding to a conduit section with a deflection about 180° in each case. The two ends of such a conduit section are each connected to a pipe section. In the case that the pipe sections are double-walled, the deflection elements are also double-walled, and an intermediate space of the deflection elements is connected to the intermediate space of the double-wall pipes. The deflection elements can be formed at least partly as part of the connection pieces. The deflection elements, as far as the leading of the fresh water is concerned, thus form deflection sections. The deflection elements, however, are not designed as pipes but as hollow regions in the connection piece, for example as recesses, on manufacture of the connection piece by way of moulding, injecting or milling. The pipes are inserted into the connection pieces for connection to the deflection elements. They can thereby be sealed with sealing rings, a sealing mass such as silicone or a two-component elastomer. The deflection runs in an essentially vertical plane in the case that the pipe sections lie above one another.

A further alternative is to provide a connection piece with an elastic sheath as an outer skin, for example of silicone, wherein a section of the outer skin is formed for sealing to an inserted pipe section.

In an embodiment, one of the connection pieces includes a sheath of an elastic plastic that covers at least a part of the connection piece and forms a separation between regions leading fresh water and regions of the heat exchanger that lead waste water. This embodiment can also be realised if no deflection elements of a deflection about 180° are present or if none at all are present. If no deflection elements whatsoever are present, the connection pieces are pure collection pieces.

An intermediate region between the sheath and the respective connection piece is in connection with the intermediate space of the pipes and/or other elements, so that the leakage water can flow from the intermediate space to the intermediate region and vice versa. If no leakage water is present, then the sheath can bear tightly on the connection piece. If leakage water exits, then the sheath can expand due to its elasticity, and receive the leakage water and lead this further.

In an embodiment, a region of the sheath forms a sealing region between the connection piece and the drain trough, in particular a trough wall or the trough base. This sealing region therefore seals the fresh water feed or the fresh water discharge with respect to the inside of the drain trough, in particular as a second separation. This separation can also be indicated as an outer separation or as an outer wall, departing from the fresh water region.

In an embodiment, a region of the sheath forms a sealing region between the connection piece and a pipe section that is inserted into this. This sealing region thus seals a pipe section with respect to the inside of the drain trough, in particular as a second, outer separation. The sheath bears on the outer pipe of the pipe section, either as a sleeve which, following the pipe section, leads away from the connection piece or as a sleeve, which is introduced into the connection piece and lies between the connection piece and the pipe section.

In an embodiment, a region of the sheath includes a sealing region between the connection piece and a closure of a viewing opening, which is inserted into the connection piece. This sealing region thus seals the intermediate space of the connection piece with respect to the inside of the drain trough, as part of a second, outer separation. The sealing region for example overlaps the viewing opening and is pressed inwardly against the edge of the viewing opening by way of the inserted closure.

In an embodiment, a region of the sheath forms a sealing region between the connection piece and a cover that lies on the connection piece, in particular a damming cover, or another element, wherein an opening is present in the cover, and the opening is sealed with respect to a region around the connection piece by way of this sealing region. This region around the connection piece is the run-off region. Typically therefore, this sealing region seals the run-in region with respect to the run-off region. The opening in the cover or damming cover for example permits a view onto the sheath or through the sheath (in the case that it is transparent) or through a hole in the sheath and through a viewing opening, which is arranged behind this hole in the connection piece.

In an embodiment, a material is incorporated in an intermediate region between the sheath and the connection piece, and this material changes its colour on absorbing water, and wherein the sheath is transparent or semi-transparent (thus not opaque). With this, leakage water, which gets into the intermediate region, leads to a colour change that can be recognised from the outside through the sheath, for example through an opening in the cover or the damming cover, as has been described above.

The deflection elements can be formed in connecting pieces that do not also have the function of connection pieces or collection pieces. Such connecting pieces only have one, two or more deflection elements and by way of this connect two, four or a larger, even number of pipe sections to one another. A heat exchanger unit at one end can therefore include such a connecting piece, and at the other end a connection piece forming a connection of a pipe section to the fresh water feed and of another pipe section for the fresh water discharge, and optionally also includes one or more deflection elements.

In an embodiment, the pipe sections are bent, wherein each of the pipe sections runs in an assigned, horizontal plane. In each case, an end of a bent pipe section can be arranged in the proximity of a beginning of the same pipe section. A bent pipe section can therefore almost form a closed loop. Thereby, it can be shaped following a segment of a circle, for example about an angle of more than 270°. Several such pipe sections are arranged above one another, for example exactly above one another. Alternatively, they can be arranged offset to one another in the radial direction, for example by way of pipe sections lying above one another in each case following circle segments with different radii.

As already described, connection pieces or connecting pieces are arranged at the beginning and end of these bent pipe sections in each case. In this embodiment, these connection pieces or connecting pieces can be joined into a single part. Such a combined connection piece or connecting piece thus comprises deflection elements, in each case for the beginning and the end of the pipe sections.

Connection pieces that each include one or more deflection elements as deflection sections can be present in this heat exchanger with bent pipe sections, wherein a deflection element corresponds to a conduit section that realises a vertical offset of the conduit, thus the two ends of such a conduit section are connected onto pipe sections, which are vertically offset to one another, and lead the conduit further in the same direction or in the same peripheral direction.

It is the case for all embodiments, that the connection pieces or connecting pieces can be moulded or injected from plastic or metal. They can be manufactured in a single-walled or double-walled manner. They can be manufactured of only one material, or of a combination, such as for example with an inner part of metal, in which the fresh water is led, and with an outer part or a sheath for example of plastic, in particular silicone, which realises the second separating wall.

In an embodiment, the heat exchanger includes a double-walled separation between regions leading fresh water and regions leading waste water, by way of an intermediate space, wherein the pipe sections are formed by double-wall pipes, and wherein a connection unit is present, wherein an inner region of the connection unit is separated from waste-water-leading regions in a fluid-tight manner, and conduits leading fresh water, in particular pipes and/or reinforced hoses, are arranged in the inner region of the connection unit in a single-walled manner, and the inner region is connected to an intermediate space of the double-wall pipes.

Such a connection unit can also be a double-walled connection piece or connecting piece.

Generally, with regard to the intermediate space, it is the case: different volumes, which form the intermediate space (intermediate space of the connection pieces, intermediate space of the double-wall pipes, inner region, . . . ), are in fluid connection with one another, so that the fluid can get from one volume into the other volumes. If a leak arises, then—depending on the position of the leak—either fresh water or waste water gets into the intermediate space and can be detected there. A sensor can be present in the intermediate space for this, and/or a control opening, at which the leaking fluid exits or becomes visible through a window or viewing opening.

Connection elements, for example ribs (fins), spacers, weld points, etc., which bridge the intermediate space have a diameter for example, or a maximal extension in at least one direction, of two millimetres. This corresponds to common standards for the design of heat exchangers between fresh water and waste water.

In an embodiment, the connection unit as a whole is pivotable with respect to the drain trough and is connected to pivotable connections, and the at least one heat exchanger unit is connected essentially rigidly on the connection unit and can be pivoted out of the drain trough by way of pivoting the connection unit.

In an embodiment, the connection unit is assembled in the drain trough in an essentially rigid manner and includes single-walled conduits leading fresh water, in particular pipes and/or flexible hoses, in particular reinforced hoses, in the inner region, for the transition between the connection pipe-stubs and heat exchanger units, and the at least one heat exchanger unit is connected on the connection unit with a first and second rotatable connection, wherein the two rotatable connections are rotatingly arranged about a common pivot axis.

In an embodiment, the connection unit is assembled on the drain trough in an essentially rigid manner, but despite this includes pivotable elements that are pivotably arranged with respect to other elements of the connection unit and with these other elements are connected in a fluid-tight manner to elastic and fluid-tight elements, for example to a bellows or membranes of rubber or of another plastic, and effect a separation of the inner region of the connection unit from regions leading waste water on account of this. The at least one heat exchanger unit is fastened on the pivotable elements, and the connections of the heat exchanger unit lead through the pivotable elements, for example to flexible hoses, in particular reinforced hoses, in the inner region of the connection unit.

In an embodiment, the heat exchanger includes a siphon, through which waste water gets to the distribution element, wherein the siphon surrounds the at least one heat exchanger unit.

More precisely, one can say that the siphon surrounds the at least one heat exchanger unit, considered in a horizontal section plane in the region of the heat exchanger unit. The siphon thus runs around the at least one heat exchanger unit. Channel gases that enter through the distribution openings are held back by the siphon, in particular at all sides around the at least one heat exchanger unit. This is in contrast to heat exchangers from the state of the art, wherein only one cover lies between the channel gases and the surroundings, and as a result this cover must lie on its underlay in an as gastight as possible manner. Alternatively, this design allows the absence of a further siphon after the heat exchanger (for example the trough dour trap mentioned above), by which means the construction height of the heat exchanger can be kept low.

The siphon can be a multi-staged one, i.e. consist of individual siphons or siphon stages, which are arranged serially one after other. A legally stipulated damming height of the siphon (for example 5 cm, so-called water trap height) with a small construction height can be achieved by way of this.

In an embodiment, the heat exchanger includes a damming element, which surrounds the at least one heat exchanger unit, and a distribution element for distributing waste water over the at least one heat exchanger unit, wherein the damming element holds back running-off water, so that it flows over the distribution element.

The distribution element can include distribution openings. These are arranged essentially vertically at least above one or more straight pipe sections. The distribution openings can also be arranged above bent pipe sections, for example if several bent pipe sections that each run essentially horizontally, arranged above one another form a deflection. The distribution element can be formed as one piece with the damming element, for example in the form of an elongate container that is open to the bottom and is with holes in the cover.

In an embodiment, the heat exchanger includes a cover, which with a cover edge surrounds the damming element.

Expressed more precisely, the cover surrounds the damming element considered in a horizontal section plane in the region of the damming element.

From this, in particular results the fact that a downwardly reaching part of the cover edge forms the siphon, or the region, below which the waste water must flow, and this part thus forms an odour trap.

Running-off water therefore runs through below the cover edge and over the damming element to the distribution element and through its distribution openings.

In an embodiment of the heat exchanger, the damming element, in particular with a lower edge, lies on the drain trough, with a peripheral seal between the damming element and the trough base.

The seal can be fastened on the damming element. Alternatively, the seal can be fastened on the trough base, and the damming element lies on the seal or is inserted into the seal.

In the case that the seal does not perfectly seal, or if the damming element is removed, then the siphon empties into the drain trough and into the run-off pipe-stub due to this.

In an embodiment of the heat exchanger, this includes at last two heat exchanger units, wherein only one of the heat exchanger units or two heat exchanger units are operated, depending on a volume flow of the waste water.

Thus in the case of a low volume flow (or throughput quantity), by way of this only one heat exchanger unit is operated, which is to say over which waste water flows and through which fresh water flows. If the volume flow exceeds a first threshold value, then the operation of a further heat exchanger unit is assumed in an abrupt or continuous manner. Analogously, a third heat exchanger unit can be present with a further threshold value, etc.

In an embodiment, one of the at least two heat exchanger units is fed by a pressure-controlled valve that opens when an entry pressure of the valve exceeds a first pressure threshold value.

The valve closes, for example on falling short again of a second pressure threshold valve at the entry of the value. The second pressure threshold value can be smaller than the first one.

In an embodiment, the distribution element includes a first and a second group of distribution openings, wherein the distribution openings of the first group are arranged above a first heat exchanger unit, and are subjected to through-flow already with a low volume flow of the waste water, and the distribution openings of the second group are arranged above a second heat exchanger unit and are not subjected to throughflow until the volume flow of the waste water exceeds a threshold value.

This can be realised by way of the distribution openings of the second group, for example, each having a raised edge (compared to the distribution openings of the first group). Alternatively, an overflow or damming region of the damming element and which leads to the distribution openings of the second group can be higher than a corresponding overflow, which leads to the distribution openings of the first group. Alternatively or additionally, a separating wall or a separating rib (fin) can lie between the regions of the two groups of distribution openings. Waste water then only flows over the rib (fin) when the volume flow of this exceeds the threshold value.

In an embodiment, the distribution element includes at least one overflow opening that permits waste water to flow off, should the distribution openings not be able to lead away the waste water.

The overflow opening can lead the waste water past the at least one heat exchanger unit and/or, flowing over the pipes of the heat exchanger unit, into the drain trough.

Due to its low construction height, the heat exchanger can be arranged in an edge region of a shower tray. However, it can also be arranged directly at the run-off (drain) of a shower or bath tub, for example in or on a wall next to a shower or bath tub, or in the region of a bath tub edge. The heat exchanger be can supplied with waste water from several showers, which for example are arranged next to one another, or from a shower and from a bath tub, which for example is arranged next to the shower.

In an embodiment, the heat exchanger is combined with a shower separating wall into a construction unit. A transition between both and which is sealed with regard splashed water can be realised in a reliable and simple manner by way of this, and the final assembly is simplified.

In an embodiment, the heat exchanger includes a plug, wherein the plug prevents a run-off of water out of the drain trough in a first position of the plug, and permits the run-off of water out of the drain trough in a second position of the plug. Thereby, the plug can include an overflow opening which permits a run-off or draining of water in both positions, if this exceeds a certain height in the drain trough.

The different aspects of the invention can be realised individually, thus independently of one another, or also in combination with one another.

Basically, the heat exchanger according to the different aspects is envisaged for the heat exchange between the waste water and fresh water. However, other applications are also possible, with which for example a reduced construction height with a good efficiency, and/or a high flexibility on assembly and/or a good servicing ability and a simple cleaning and/or a high reliability concerning leakages are demanded. The two fluids or media, between which the heat is exchanged, are indicated as waste water and as fresh water for the sake of simplicity, however instead of this one can generally also speak of a first (releasing thermal energy) medium and a second (absorbing thermal energy) medium.

The heat exchanger units as a rule are operated as counterflow or cross-counterflow heat exchangers. An operation as equi-flow or cross equi-flow heat exchangers however is also possible.

For all aspects, it is case that the drain trough or the heat exchanger can be arranged in order to receive waste water from a shower tray or a from wash basin or from a bath tub. Applications in other fields are also possible.

BRIEF DESCRIPTION OF THE DRAWINGS

The subject-matter of the invention is described in more detail hereinafter by way of preferred embodiment examples, which are represented in the accompanying drawings. In each case are shown schematically in:

FIGS. 1a-1c a first embodiment of a heat exchanger, in different sectioned views;

FIG. 1d a detail of a variant of a seal;

FIG. 2 a variant of the first embodiment;

FIGS. 3a-3d a second embodiment of a heat exchanger, in different sectioned views;

FIGS. 4a-4d a third embodiment of a heat exchanger in different sectioned views;

FIGS. 5a-5b installation variants of heat exchangers;

FIGS. 6a-6m a fourth embodiment of a heat exchanger, in different sections and views;

FIG. 8 a multistage siphon;

FIGS. 9a-9b a distribution element and feeds of a heat exchanger which can be operated in a multi-staged manner;

FIG. 10 a heat exchanger with a damming element formed on the drain trough;

FIG. 11 a pipe of a heat exchanger unit;

FIGS. 12a-12b double-walled pipes;

FIG. 13 a pivotable connection;

FIG. 14 a sixth embodiment of a heat exchanger;

FIGS. 15a-15b a connection piece;

FIGS. 16a-16d a double-walled connection piece;

FIGS. 17a-17f a seventh embodiment of a heat exchanger;

FIG. 18a-18c an eighth embodiment of a heat exchanger;

FIGS. 19a-19b a ninth embodiment of a heat exchanger, with bent pipe sections;

FIG. 20 pipes which are arranged exactly above one another, and above one another in an offset manner;

FIG. 21 a cleaning appliance;

FIG. 23 a drain trough with a discharge valve;

FIG. 24 the integration into an existing installation;

FIG. 25 an embodiment with a seal running in a plane manner;

FIG. 26 different shapes of seals;

FIGS. 28a-28d details of the damming cover of FIG. 27;

FIGS. 29a-29b a further connection piece;

FIGS. 30a-30b cross sections through this; and

FIGS. 31a-31b disassembly elements.

DETAILED DESCRIPTION OF THE INVENTION

Figure 6L:
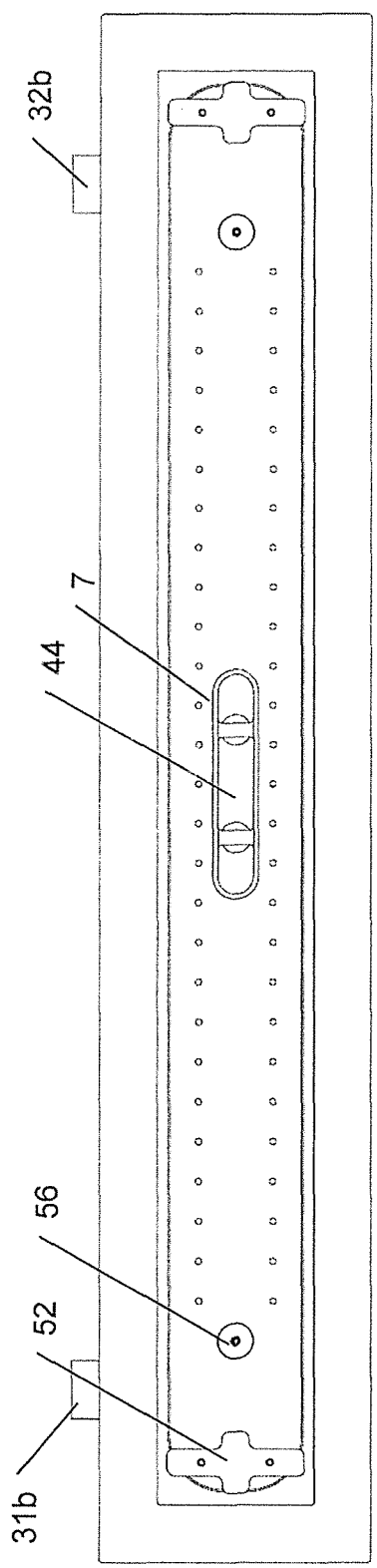

The reference numerals used in the drawings and their significance are summarily listed in the list of reference numerals. Basically, the same parts are provided with the same reference numerals in the figures.

FIGS. 1a-1c show a first embodiment of a heat exchanger in two variants in different sectioned views. The heat exchanger 1 according to the variant of FIG. 1b includes a single heat exchanger unit 2, and in the variant of FIG. 1c includes two heat exchanger units 2. The latter are connected in parallel, which is to say the flow of fresh water is divided into the two heat exchanger units 2. The one or both heat exchanger units 2, in both variants, are connected on a first connection piece 21 and a second connection piece 22 (connection pieces can also be generally indicated as collection pieces). The first connection piece 21 is releasably connected on a first connection pipe-stub 31. The second connection piece 22 is releasably connected on a second connection pipe-stub 32. The heat exchanger unit or units 2 are arranged in a drain trough 2 or simply trough, and the connection pipe-stubs 31, 32 lead through a trough base 33. The heat exchanger unit(s) 2 are supplied with fresh water through the first connection pipe-stub 31 and the first connection piece 21, and the fresh water is led further from the heat exchanger unit or units 2, through the second connection piece 22 and the second connection pipe-stub 32 directly to a consumer for example, a shower head or tap, or indirectly via a mixing tap, to an instantaneous flow heater or a boiler, etc.

The first connection piece 21 can include a shut-off valve 312. A temperature sensor 311, 321 for measuring the entry temperature and the exit temperature of the fresh water can be arranged in each case on the two connection pieces 21, 22 or the connection pipe-stubs 31, 32. A flow sensor 322 can be arranged for measuring the volume flow of the fresh water. The energy recovered in the heat exchanger can be computed from the flow and the temperatures. Individual ones or several of these sensors can alternatively be arranged on or in the pipe sections 24.

A heat exchanger unit 2 in each case includes several, in the present embodiment three, straight pipe sections 24 that are arranged vertically above one another. The two connection pieces 21, 22 lie at opposite ends of the heat exchanger unit 2 given an odd number of straight pipe sections 24. Fresh water successively flows through the straight pipe sections 24 of a heat exchanger unit 2, wherein in each case a deflection section 25 is present between two successive, straight pipe sections 24. A diameter of a bending in the deflection section 25 in the embodiment of FIG. 1a is essentially equal to the distance of the pipes of the straight pipe sections 24. It is particularly when the pipes are designed in a double-walled manner that the deflection sections are not produced by bending the pipes, but by way of connecting the straight pipe sections 24 with separately manufactured double-walled deflection pipes, for achieving such a small deflection radius.

The drain trough 3 includes a trough base 33 with a recess 35, as well as trough walls 34 connecting onto the trough base 33. The recess 35 leads waste water to a run-off pipe-stub 36 provided for connection to the sewage system. As is shown in FIG. 1c, the run-off pipe-stub 36 can include a wall or a run-off block 361, which projects from above into the run-off pipe-stub 36 and which with a prominence 362 arranged after the run-off block 361 in the run-off direction forms a further siphon or trough odour trap 37, in the run-off. Such a trough odour trap 37 can also be realised in all other embodiments.

With regard to the recess 35, the trough base 33 can be considered as a shoulder. A damming element 4 preventing running-off waste water from running off into the recess 35 is arranged on this shoulder, thus on the trough base 33, in a region around the recess 35 and in particular on a plane region of the trough base 33, and this waste water dams to a damming height by way of this. Thus, only a single sealing plane is present at the lower side of the siphon.

The waste water after exceeding the damming height flows over a distribution element 42. The distribution element 42 includes distribution openings 43, which distribute the waste water over the at least one heat exchanger unit 2. The waste water thus above the straight pipe sections 24 is distributed and led over these. The distribution openings 43 are typically a linear arrangement of holes in the distribution element 42. The distribution openings 43 however can also be several slots arranged linearly one after the other, or a single long slot per heat exchanger unit 2.

The distribution element 42 can be formed as one piece with the damming element 4. The damming element 4, for example, is a container that is open to the bottom and whose side walls dam the waste water, and whose upper surface acts as a distribution element 42 and is provided with the distribution openings 43.

The lower edges of the damming element 4 can be provided with a seal 41, in order to seal the damming element 4 with respect to the trough base 33. The seal 41 can alternatively be fastened on the trough base 33, and the damming element 4 can be applied onto the seal 41 or inserted into a groove in the seal 41, as is represented for example in FIG. 1d.

A trough 45, in particular a trough that is peripheral round the damming element 4 and the heat exchanger unit 2 is present between the damming element 4 and the trough wall 34.

A cover 5 is arranged above the damming element 4 and the distribution element 42. The cover 5 is likewise a container that is open to the bottom. Its side walls, also called cover wall 51 or siphon wall, project into the region, in which the waste water is dammed by the damming element 4. The waste water is therefore forced to flow at the outside around the cover 5 and the cover wall 51, and then through inwards below the cover wall 51 and then upwards along the side walls of the damming element 4, to the distribution element 42. A siphon or an odour trap is formed by way of this, and specifically straight way at the beginning of the waste water flow into the heat exchanger 1, and this being the case without gas-tight seals (between the channel gases and the surrounding air) becoming necessary.

The upper surface of the cover 5 can be arranged in an essentially plane manner in the plane of the base of a shower tray. A narrow run-off slot 53 arises around the cover 5, between the cover 5 and an upper edge of the drain trough 3.

A run-in region E, a siphon region S and a run-off region A are arranged in the drain trough 3 in all embodiments, through which regions waste water flows one after the other and in this sequence, on operation of the heat exchanger 1.

FIG. 2 shows a variant of the first embodiment. Here, a covering 54 arranged on the cover 5, in one or in two directions is designed more widely and longer, that the damming element and the heat exchanger unit 2. The drain trough 3 or an underlay base surrounding the drain trough 3 comprises a feed region which leads water running off around the covering 54 into the drain trough 3 and thus into the siphon. It is possible to manufacture a heat exchanger 1 in standard sizes by way of this, and to adapt the length of the run-off slot 53 formed on the edge of the covering to showers of a different size, by way of coverings 54 of a different size.

FIGS. 3a-3d show a second embodiment of a heat exchanger in different sectioned views and variants. Most elements with regard to function are the same as in the preceding figures, and the description is not therefore repeated, but it is only the differences which are described: The deflection sections 25 here have a larger diameter than the vertical distance between the straight pipe sections 24. It is possible to manufacture the pipe sections 24 and the deflection section 25 from the same pipes by way of this This is the case for example if the pipes are double-walled and the minimal bending radius of these pipes is accordingly large.

Individual ones of the deflection sections 25 are led out of the plane of the straight pipe sections 24, in a heat exchanger unit 2, since the deflection sections 25 in the region of these require more space in the vertical. Individual ones of the defection sections 25 thus, at least in sections, run in a plane parallel to the plane of the straight pipe sections 24 and of the other deflection sections 25. This is visible in the plan view according to FIG. 3b. This figure shows a single heat exchanger unit 2.

The FIGS. 3c and 3d show two of the heat exchanger units 2 according to FIGS. 3a-3b, parallel to one another in a drain trough 3.

Moreover, a variant, in which the pipes are compressed in the vertical at least in the straight pipe sections 24, is shown in FIG. 3d. They obtain, for example, an oval or elliptical cross section by way of this. Their diameter in the vertical direction is therefore smaller than in the horizontal direction. A reduction in the height of the heat exchanger unit 2 can be achieved by way of this. Pipes, which are compressed in such a manner can, of course, be applied in all other described embodiments and combined with their features.

FIGS. 4a-4d show a third embodiment of a heat exchanger, in different sectioned views. Most elements are functionally the same as in the preceding figures and the description is thus not repeated, but it is only the differences described: The represented heat exchanger unit 2 in each case includes several, six in the present embodiment, straight pipe sections 24, which are arranged vertically above one another. The two connection pieces 21, 22 lie at the same end of the heat exchanger unit 2 given an even number of straight pipe sections 24. As with the second embodiment, the deflection sections 25 have a larger diameter than the vertical distance between the straight pipe sections 24 measures, and individual ones of the deflection sections 25 are led out of the plane of the straight pipe sections 24. FIG. 4a shows a single heat exchanger unit 2, and in a variant of the embodiment two heat exchanger units 2 are arranged parallel to one another, analogously to the embodiment of FIG. 3b or 3c.

FIG. 4d apart from the already described compressed or squashed pipes 23 shows a mechanical trough odour trap 27. This trap closes the run-off pipe-stub 36 with respect to the sewage system. It can be manually operated, or it can be mechanically coupled to the damming element 4, so that the trough odour trap 37 is closed on lifting or removing the damming element 4.

FIGS. 5a-5b show the main installation variants of heat exchangers: FIG. 5a schematically shows the already described installation into a run-off trough of a shower tray, and the connection of the run-off pipe-stub 36 to a run-off pipe 363 to the sewage system. FIG. 5b shows a combination with a further run-off 55, for example from a bath tub. The further run-off 55 thereby leads from outside the drain trough 3 and specifically in its siphon region, thus in a region outside the damming element 4. The waste water, which is fed through the further run-off 55, is thus likewise led through the siphon onto the distribution element 42.

FIGS. 6a-6m show a fourth embodiment of a heat exchanger in different sections and views. Most elements are functionally the same as in the preceding figures and the description is therefore not completely repeated, but above all the differences are described: Here, the heat exchanger 1 includes two heat exchanger units 2 that are connected in parallel and connected at opposite ends on a first connection piece 21 and a second connection piece 22.

The two connection pipe-stubs 31, 32 are designed of two parts: in each case an upper part 31a, 32a and a lower part 31b, 32b are connected to one another, in particular connected in a releasable manner. The upper part 31a, 32a is located essentially within the drain trough 3 and can be designed in a double-walled manner, and the lower part 31b, 32b is located essentially outside the drain trough 3 and as a rule is not double-walled. The lower part 31b, 32b can be connected to the corresponding upper part 31a, 32a at different orientations, which for example are offset to one another by 90° or 180° in each case. The orientation of the connections can therefore be adapted to the conditions on installation.

Especially FIGS. 6b and 6f show: the connection pieces 21, 22 are releasably assembled on the connection pipe-stubs 31, 32 by way of closure levers 314, 324. For connecting the first connection piece 21 for example to the first connection pipe-stub 31, the first closure lever 314 is pivoted to the side and the first connection piece 21 is applied onto the first connection pipe-stub 31. On closure of the closure lever 314, this with its upper cam surface engages on a part (or pressing element) 315 of the first connection piece 21 and thus presses the first connection piece 21 against the first connection pipe-stub 31. The closure lever 314 preferably snaps or locks in, at an end position of this. The first connection piece 21 is reliably pressed against the first connection pipe-stub 31 by way of this, and a fluid-tight connection can be realised.

On opening the closure lever 314, this with its lower cam surface presses the first connection piece 21 away from the first connection pipe-stub 31. A possibly snapped-in or detent connection, for example a connection with O-rings 213, is thereby carefully released.

The upper lever surface as a locking element has a discontinuity or a bending 315, which renders an opening of the closure lever 314 more difficult or blocks this, when the heat exchanger unit 2 is under pressure and the first connection piece 21 is pressed upwards.

The shut-off valve 312 includes a valve, for example a ball valve, and an actuation element, here a lever. This shut-off lever is shaped and arranged such that the closure lever 314 is blocked in its closed position, as long as the shut-off valve 312 is open. The closure lever 314 can only be opened when the shut-off lever is rotated into a position, in which the shut-off valve 312 is closed.

No closure lever is present in other embodiments, but the connection pieces 21, 22 are fastened onto the connection pipe-stub 31, 32 by way of screws, for example. These screws are then released for disassembly of the heat exchanger unit 2.

FIGS. 6d and 6e show: The straight pipe sections 24 and the connection pieces 21, 22 are designed in a double-walled manner. The connection pipe-stubs 31, 32 are likewise designed in a double-walled manner. An intermediate space 212 of a first connection piece 21 is thereby connected to an intermediate space 315 of the first connecting pipe-stub 21. O-rings 213 are arranged concentrically between the first connection piece 21 and the first connection pipe-stub 21, for sealing the fresh water conduit and the intermediate spaces. The double-walled pipe 23 is connected with an outer pipe 23a to an outer part 21a of the first connection piece 21 and with an inner pipe 23b to an inner part 21b of the first connection piece 21. An intermediate space of the pipe 23 (not visible in the figure) is connected to the intermediate space 212 of the first connection piece 21. The outer and inner part 21a, 21b of the first connection piece 21 are connected to one another by way of ribs (fins). The ribs (fins), for example, have a thickness of less than 2 millimetres, according to legal stipulations concerning heat exchangers in the region of drinking water.

A viewing opening 211, for example of a transparent plastic or glass, permits a view into the intermediate space 212 and allows one to determine as to whether fluid is located in the intermediate space 212.

FIGS. 6g and 6h apart from the already described elements show a plug 7 for the selective closure of the run-off or the run-off pipe-stub 36 itself. The heat exchanger units 2 are arranged such that a gap, in which the plug 7 is arranged, remains between them. The plug 7 can be actuated by hand and can be in at least two different positions. The plug 7 releases the run-off in a first position, which is envisaged for the operation of the heat exchanger 1. The plug 7 closes the run-off in a second position, which is envisaged provided for a chemical cleaning of the heat exchanger 1. The drain trough 3 can be filled with water in this case. A cleaning and/or descaling agent can be added to the water and take its effect.

The plug 7 can act as an overflow in both positions, i.e. water that flows over the upper edge of the plug 7, flows through the plug 7 to the run-off. On operation of the heat exchanger 1, the water in this case firstly flows through the overflow opening 44 of the distribution element 42 and then through the plug 7. One-way valves, for example membrane valves 77 can be arranged in the plug 7, and these valves permit the run-off of water but prevent the rising of channel gases. This is only of relevance with regard to the cleaning, since the run-off is open in any case on operation and the channel gases are held back by the siphon.

In an embodiment, the plug 7 is higher in the second position (thus given a closed run-off) than in the first one. Then on assembly of the damming element 4 or the distribution element 42, this can press the plug 7 downwards, whereby the run-off is opened. This prevents the run-off remaining mistakenly closed. Thus generally speaking, the damming element 4 moves the plug 7 into an opened position on assembly.

Knurled thumb screws serve as fastening elements 56, in order to hold down the damming element 4 against the effect of buoyancy, and to achieve a reliable sealing with respect to the trough base 22 by way of the seal 41. These fastening elements can be fastened on both connection pieces 21, 31.

The fastening elements 56 can act against a spring or themselves be designed such that the damming element 4 is lifted a little, for example by a few millimetres, on releasing the fastening elements 56. The trough 45 is emptied by way of this and can be through-rinsed for cleaning.

The cover 5 can include one or more closable openings. The following method for cleaning the heat exchanger unit 2 can be realised by way of this: A cleaning agent in the form of foam is sprayed or injected below the damming element 4 through these openings. The foam together with released contamination is flushed away after a time of action. The cleaning agent due to the fact that it is present as foam, does not flow away through the run-off pipe-stub 36, but can act upon the pipes 23 and other elements of the heat exchanger unit 2 during the complete action time, which is to say exposure time. The method in particular is suitable for removing a bio-film.

Spacer elements or support elements 52 can support the cover 5 on the damming element 4 or the distribution element 42.

FIG. 6i shows a cross section onto the short side of the heat exchanger 1.

FIGS. 6j and 6k each show a lateral view of the heat exchanger 1, and only the drain trough 3, the outer parts of the connecting pipe-stub as well as the run-off pipe-stub 36 are thereby visible from the outside.

FIG. 6l shows a plan view of a heat exchanger 1 with a removed cover 5.

Figure 6M:
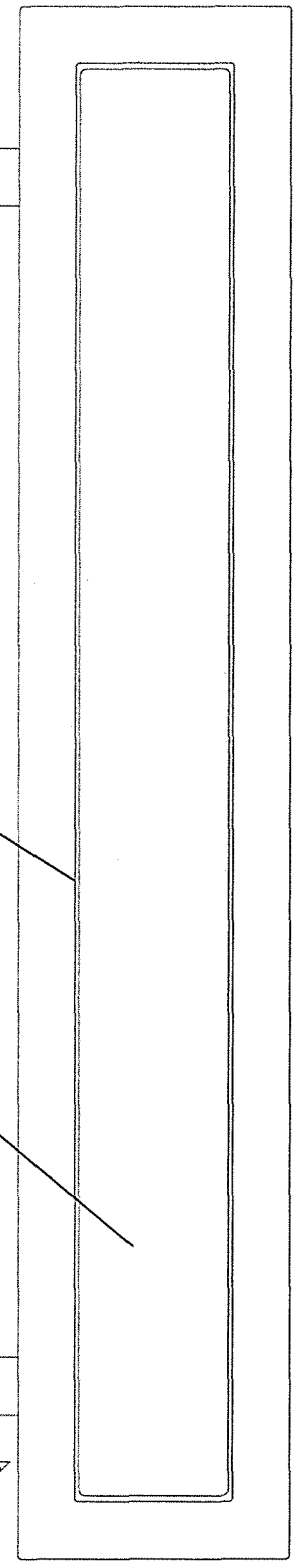

FIG. 6m shows a plan view of a heat exchanger 1 with an applied cover 5.

Figure 7A:
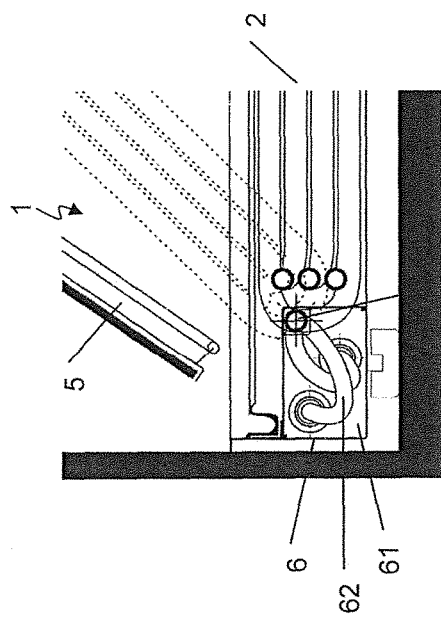
FIGS. 7a-7d a fifth embodiment of a heat exchanger, in different sectioned views and conditions.
Figure 7B:
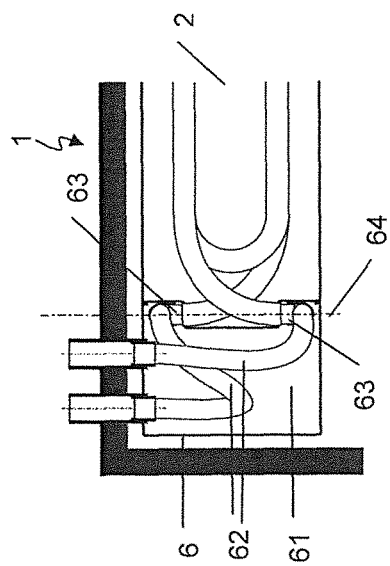
Figure 7C:
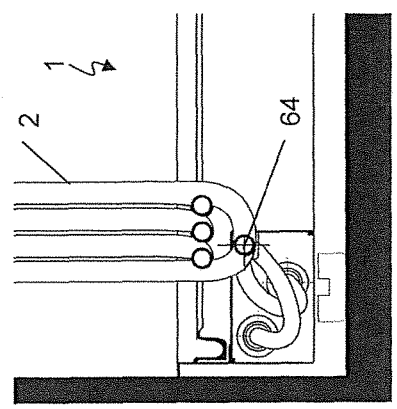
Figure 7D:
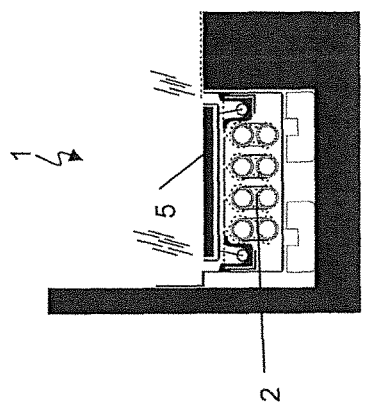

FIGS. 7a-7d show a fifth embodiment of a heat exchanger in a sectioned view from above (FIG. 7a), two lateral sections views of the longitudinal side (FIGS. 7c and 7d) with a heat exchanger unit 2 that is partly and completely pivoted out, and in a lateral sectioned view of the narrow side (FIG. 7b). Here, a heat exchanger unit 2 is rotatably or pivotably arranged with a pipe coil. The pivot mechanism of course can also be realised for heat exchanger units 2 or pairs of heat exchanger units 2 as in the other embodiments. The heat exchanger 1 includes a connection unit 6 that is water-tight with respect to the remaining drain trough 3. The fresh water feed and fresh water discharge leads from outside the drain trough 3 into the connection unit 6, and in an inner region 61 of the connection unit 6 through flexible conduits 62 through two rotatable connections 63 into the heat exchanger unit 2. The two rotatable connections 63 are rotatably arranged about a common pivot axis 64.

The pipes of the heat exchanger unit 2 can be designed in a double-walled manner. An intermediate space 23c of the pipes (for this see FIGS. 12a and 12b) is then in connection with the inner region 61, so that penetrating leakage water gets into the inner region 61 and becomes visible, for example through a control opening or viewing window. The leakage water can then become directly visible, or a moving indicator element, for example a float, can displace or move, so that this indicator element is visible through the control opening or the viewing window given the presence of leakage water.

FIG. 8 shows a multi-stage siphon. Such a multi-stage siphon can be combined with all embodiments and can also be realised autonomously in other applications. The cover 5 not only includes one, but two cover edges 51a, 51b. These are arranged in one another, thus quasi concentrically to one another. The damming element 4 includes at least one peripheral, first or inner trough 45a, which is open to the top. An inner cover edge 51a runs within the first trough 45a. An outer cover edge 51b runs outside the first trough 45a. Running off waste water thus flows below the outer cover edge 51b, over the edge of the first trough 45a, below the inner cover edge 51a and over the damming element. 4. A seal 41 can seal the first trough 45a with respect to the drain trough 3.

A further or outer trough 45b is thus formed between the inner trough 45a and the trough wall 34. Alternatively, as is shown in FIG. 8, the outer trough 45b can also be part of the damming element 4, which is to say connected to the first trough 45a or formed together with this. A seal can then also be present at the location indicated at 41b.

FIG. 9a shows a cross section through a distribution element 42 with different types of distribution openings 43. A group of first distribution openings 43a is arranged above a first heat exchanger unit 2a, a group of second distribution elements 43b is arranged above a second heat exchanger unit 2b. A group of third distribution openings 43c can optionally be arranged above a third heat exchanger unit 2c. The first distribution openings 43a lie in recesses and therefore subjected to throughflow before the second distribution openings 43b The second distribution openings 43b have no or only a slightly raised edge and essentially are not subjected to throughflow until the flow of waste water exceeds a first threshold and is so large that it can no longer be received by the first distribution openings 43a. Analogously, the third distribution openings 43c include a raised edge, and accordingly are not subjected to throughflow until the waste water flow exceeds an even higher threshold.

The supply of the heat exchanger units is represented schematically: the first heat exchanger unit 2a is always subjected to throughflow, the second heat exchanger unit 2b is fed through a first pressure-controlled valve 245b and is only fed when the volume flow of fresh water and thus also a pressure at the entry of the valve 245 exceed a threshold value. Optionally, the optional third heat exchanger unit 2c is analogously fed by a second pressure-controlled valve 245c and is only fed when the volume flow of the fresh water exceeds a further, higher threshold value.

An alternative form of distribution openings 43 is represented schematically in FIG. 9b with regard to detail, which only shows the distribution element 42. The first distribution openings 43a have no edge. The second valve openings 43b have a raised edge and are therefore not subjected to throughflow until the flow of the waste water is so large that it can no longer be completely received by the first distribution openings 43a. Analogously, the third distribution openings 43c have an edge that is raised to an even greater extent and, accordingly, are not subjected to throughflow until the waste water flow exceeds an even higher threshold.

Distribution openings that are not subjected to throughflow until an even greater volume flow is present, can additionally also be present, for example with edges that are raised to an even greater extent that the second valve openings 43b, and accordingly a further heat exchanger unit 2 is fed by a further pressure controlled valve that does not respond until at an even greater further pressure threshold value.

A flowmeter can also be applied instead of pressure-controlled valves, and controlled valves (for example electrically, hydraulically, mechanically etc.), which are opened on exceeding a respective threshold value and are closed on falling short of another threshold value.

FIG. 9a, similarly as in FIG. 8, moreover shows than a single peripheral trough 45 for the siphon can also be formed on the damming element 4. The contents of the trough 45 can be emptied into the drain trough 3 on removing the damming element 4. This variant of the damming element 4 can be combined with the other described embodiments. Of course, the different groups of distribution openings 43 can however also be realised with a damming element 4 without a trough 45 formed thereon, as is the case in the other embodiments.

FIG. 10 shows a peripheral trough 45 that is formed by way of the damming element 4 being integrally formed on the drain trough 3 or being fixedly connected to this. The distribution element 42 is then put onto the damming element 4, and can thus be removed from the damming element 4 for cleaning the heat exchanger 1. Seals 41 can be arranged between the damming element 4 and the distribution element 42. A removable part 46 of the damming element 4 can be present, so that the trough 45 can be emptied for cleaning, and be optionally sealed off by a further seal 41 on the trough base 33 and on the damming element 4. The distribution element 42 can be fastened on the cover 5, for example with a simple, connection that can be released in a purely mechanical, which is to say tool-free, manner. The distribution element 42 is co-lifted on lifting the cover 5, which renders the disassembly simpler.

FIG. 11 in a schematic manner shows a possible course of a pipe 23 of a heat exchanger unit 2. Here too, no further horizontally running straight pipe section, but only a first deflection section 25a lies between a first straight pipe section 24a and a second straight pipe section 24b, seen along the heat exchanger pipes (which is to say along the flow through the pipes). However, the two described straight pipe sections 24a, 24b are not successive seen in the vertical (along the flow over the pipes). Instead, another sequence is realised in the vertical: for example by way of a third straight pipe section 24c, which seen along the pipes (after a second deflection section 25b) is subsequent to the second straight pipe section 24b, being arranged in the vertical direction between the first straight pipe section 24a and the second straight pipe section 24c. The deflection sections 25, 25a, 25b are bent out of the plane of the straight pipe sections 24a, 24b, 24c in opposite directions out, in the regions where these deflection sections overlap in the figure, in order to give way to one another.

FIGS. 12a-12b show double-walled pipes 23 each with an outer pipe 23a and an inner pipe 23b and intermediate spaces 23c. The intermediate spaces in the embodiment of FIG. 12a are formed on the inner pipe 23b, and analogously on the outer pipe 23a in the embodiment of FIG. 12b. The intermediate spaces can thereby be formed by notches or grooves or knurls. Projecting ribs can alternatively also be formed on one of the pipes. The ribs can be formed on the inner side of the inner pipe 23b. They can have a twist. The heat transfer between the medium flowing in the pipe, here fresh water, and the inner pipe 23b can be improved by way of this. If the intermediate spaces are formed on the outer pipe 23a as in FIG. 12b, then the sealing of the inner pipe 23b in a connection piece is simpler to realise, for example if sealing rings are applied for this purpose. Flow obstacles that produce turbulences and by way of this improve the heat transfer to the inner pipe can be arranged in the pipe sections instead of the ribs or additionally to these.

FIG. 13 shows a connection unit 6 with pivotable elements or rotatable connections 63, in a schematic plan view. The rotatable connections here are angled pipe-stubs. The connections 63 are connected to a fresh water feed and fresh water discharge within the connection unit 6 (not drawn). The connections 63 outside the connection unit 6 are connected to the at least one heat exchanger unit 2. The two rotatable connections 63 are rotatably arranged about a common pivot axis 64. A sealing of the rotatable connections 63 can be effected by way of these being mounted in concentric seals.

The rotatable connections 63 can be designed in a single-walled manner, or as is shown here, in a double-walled manner, with outer pipe walls 63a and inner pipe walls 63b and intermediate spaces lying therebetween (not drawn, but designed for example as in the FIG. 12a or 12b). The intermediate spaces of the rotatable connections 63 are connected to the intermediate spaces 23c of the connected pipes and to intermediate spaces of the connection unit 6. The inner construction of a double-walled connection unit 6 can be analogous to the construction of the double-walled connection pieces.

FIG. 14 shows a sixth embodiment of a heat exchanger. Here, the deflection sections 25 each run in a horizontal or an inclined plane, and all straight pipe sections 24 of the heat exchanger unit 2 are arranged above one another, vertically in a single plane (thus not in two or more planes). The deflection sections 25 in the region of the connection pieces 21, 22 each lead around these connection pieces 21, 22.

FIGS. 15a-15b show a connection piece 21, 22 with integrated deflection elements 26. These deflection elements take the place of deflection sections that are formed on the pipe. The deflection elements 26 are designed as hollow regions in the connection piece. Pipe sections, in particular horizontal pipe sections, in each case can be inserted into pipe introductions 30 of the connection pieces 21, 22 and be sealed. The connection piece 21, 22 shown in the FIGS. 15a-15b is single-walled. A double-walled connection piece can be formed therefrom, by way of a cover or an additional sheath or cap 74 (not represented here, see FIGS. 17a-17e) of the same or of a different material, for example of silicone. The connection piece can be cast (moulded) as one piece from plastic or metal with a lost mould, or as is shown, can be of several parts, with a deflection insert 27, which can be inserted into the remaining connection piece, so that both parts can be manufactured with the moulding method without a lost mould. The deflection insert 27 can be inserted in two positions. In a first position (as drawn) a transition channel 26b of the deflection insert 27 connects a lowermost pipe introduction 30 to a fresh water feed and fresh water discharge through an connection pipe-stub 31, 32 respectively, and deflection elements 26 connect the remaining pipe introductions 30 lying thereabove, to one another in each case in pairs. In a second reverse position (not drawn), the transition channel 26b of the deflection insert 27 connects an uppermost pipe introduction 30 to a connection pipe-stub 31, 32, and deflection elements 26 connect the remaining pipe introductions 30 lying therebelow, to one another in each case in pairs. The connection piece is provided for five horizontal pipe sections 24, but in an analogous manner can also be formed for three or a different, in particular odd number of pipe sections 24.

FIGS. 16a-16d show a double-walled connection piece 21, 22. The pipe introductions 30 are accordingly envisaged for receiving double-walled pipe sections 24. For this, they can include grooves 30a for receiving sealing rings in each case to an outer pipe 23a and an inner pipe 23b. An intermediate space 23c of an inserted pipe 23 (see FIG. 12a or 12b) is connected via connection holes 212a to the intermediate space 212 of the connection piece 21, 22. The connection piece can be cast or injected from plastic or metal with a lost mould. The connection piece can also be manufactured only in a single-walled manner, for example of metal, and be provided with a sheath, of example of plastic, in particular silicone.

A receiver 56b for fastening elements for example permits the receiving of a screw or a bayonet closure element for fasting one or more further elements, for example a damming element, a damming trough or damming cover.

The connection piece 21, 22 is connectable to a connection pipe-stub 31, 32, in particular can be inserted into this, wherein grooves for receiving sealing rings can be present on the connection piece 21, 22 or on the connection pipe-stub 31, 32. A section of the connection pipe-stub 31, 32 projects into the connection piece 21, 22, wherein fixation holes 28 of the two are aligned with one another, so that a pin 28b as a fixation element can be inserted through the fixation holes 28, by which means the connection piece 21, 22 is secured from withdrawal. As is shown here, the fixation holes 28 in the assembled condition lie in the inside of the connection pieces 21, 22, which leads to a space-saving construction which is simple to—clean, in contrast to fixation elements arranged outside the connection pieces 21, 22 in the drain trough 3. The fixation elements can be inserted or removed through the viewing opening 211. The viewing opening 211 can be open or be closed with a transparent or opaque cover.

The pin 28b can be stepped. If the fresh water is under pressure, then a force acts, which presses the connection piece 21, 22 out of the connection pipe-stub 31, 32. The connection piece 21, 22 by way of this moves a little out of the connection pipe-stub 31, 32, until it is present on the pin 28b. The stepping (shouldering) of the pin 28b then prevents the pin 28 from being able to be pulled out, as long as the fresh water is under pressure.

The connection pipe-stub 31, 32 can be led from the inside through a trough wall 34 and can be fixedly screwed on the trough wall 34 from the outside, by way of a nut on an outer thread 315 of the connection pipe-stub 31, 32.

A pipe-stub space 29 can be present within the connection pipe-stub 31, 32, said space lying in the fluid flow between the connection piece 21, 22 and the fresh water feed 38 and fresh water discharge 38 respectively. The pipe-stub space 29 is accessible from the inner side of the drain trough 3 if the connection piece 21, 22 is removed from the connection pipe-stub 31, 32. The pipe-stub space 29 can receive elements such a filter, a valve or a shut-off valve. These elements are thus accessible from the inside of the drain trough 3 and can be exchanged and serviced. They are located in a region, in which leakage water runs into the drain trough 3. For this reason, elements can be used, upon which less demands are made concerning the leakage reliability.

The shown double-walled connection piece is provided for three horizontal pipe sections 24, but in an analogous manner can also be formed for five or another, in particular odd number of pipe sections 24.

FIGS. 17a-17f show a seventh embodiment of a heat exchanger 1. This includes: a drain trough 3 with a run-off pipe-stub 36. A damming trough 7 is inserted into the drain trough 3, and in this trough, in turn a heat exchanger unit 2 with pipe sections 24 and connection pieces 21, 22. The connection pieces 21, 22 can be designed in a single-walled or double-walled manner with integrated deflection elements 26, thus for example as in the embodiments of FIGS. 15a-b and 16a-d.

The pipe sections 24 run within the damming trough 7 and the connection pieces 21, 22 are arranged in end-caps 74, which form a water-tight sheathing around the connection pieces 21, 22 and thus contribute to a double-walled sealing between fresh water and waste water, which is particularly useful if the connection pieces 21, 22 themselves are only single-walled.

The connection pieces 21, 22 are connected to a fresh water feed and discharge by way of connection pipe-stubs 31, 32 respectively (drawn dashed). These in each case lead through the walls of the damming trough 7 and the drain trough 3. These connections in an embodiment that is not shown, lead through the base of the damming trough 7 and of the drain trough 3.

The connection pieces 21, 22 are releasably connected in each case to the connection pipe-stubs 31, 32, in particular by way of a connection that can be created and released in a tool free manner (this also applies to the damming trough run-off 73 and the run-off pipe-stub 36, wherein this connection is not under pressure). The damming trough 7 together with the heat exchanger unit 2, which is arranged therein can thus be removed from the drain trough 3 after releasing these connections, and can thus be cleaned and serviced.

The damming trough 7 comprises a siphon opening 71 arranged in a lower region of the damming trough 7, for the entry of waste water, as well as a damming trough run-off 73. Waste water flows out of the drain trough 3 through the siphon opening 71 on normal operation of the heat exchanger 1, wherein a side wall of the damming trough 7 acts as a siphon wall. The waste water must therefore flow through below this siphon wall. The waste water subsequently flows over a distribution element 42, which in this embodiment includes a horizontal edge, up to which the waste water flowing through the siphon opening 71 dams. A distribution surface 75 connecting to the horizontal edge leads the waste water flowing over the horizontal edge over the run-off edge 76 and over the pipe sections 24 of the heat exchanger unit. The waste water collects in the damming trough 7 at the very bottom and flows through the damming trough run-off 73 into the run off pipe-stub 36 of the drain trough 3.

The run-off pipe-stub 36, the damming trough run-off 73 and the inside of the damming trough 7 are of course sealed with respect to the remains of the drain trough 3, so that in normal operation the waste water from the inside of the damming trough 7, after flowing over the pipe sections 24, does not get into the drain trough 3, and waste water from the drain trough 3 only gets to the pipe sections 24 through the siphon opening 71 and via the distribution element 42.

The inside of the damming trough 7 is open to the sewage system via the damming trough run-off 73 and the run-off pipe-stub 36. An odour-tight damming trough cover 72 therefore closes off the inside with respect to the surroundings. The cover 5 can be arranged above the damming trough cover 72, or the cover 5 can be combined with the damming trough cover 72.

FIGS. 18a-18c show an eighth embodiment of a heat exchanger. This includes: a drain trough 3 with a run-off pipe-stub 36. A heat exchanger unit 2 with pipe sections 24 and connection pieces 21, 22 is inserted into the drain trough 3. The connection pieces 21, 22 can be designed in a single-walled or double-walled manner with integrated deflection elements 26, thus for example as in the embodiments of FIGS. 15a-b and 16a-d.

The pipe sections 24 run within the drain trough 3. The connection pieces 21, 22 can be designed in a double-walled manner or in a single-walled manner, or be of a single wall and provided with a sheath The heat exchanger unit is connected to a fresh water feed and discharge via the connection pieces 21, 22 and connection pipe-stubs (not drawn). These in each case lead through the walls of the drain trough 3. These connections lead through the base of the drain trough 3 in an embodiment that is not drawn.

The connection pieces 21, 22 are each releasably connected to the connection pipe-stubs 31, 32, in particular by way of a connection which can be created and released in a tool-free manner. The heat exchanger unit 2 can thus be removed from the drain trough 3 after the release of these connections, and thus be cleaned and serviced. The connection can be secured, for example by a fixation element such as a lever (clip) or a pin 28b, which is led through a bore or a groove, from one of the connection pieces 21, 22 as well as the corresponding connection pipe-stub 31, 32. This connection can also be designed such that the fixation element is not releasable as long as the fresh water is under pressure. A lever as a fixation element can also realise one or more of the functions of a lever as is shown in FIGS. 6b and 6f, thus in particular the pressing of a connection piece away from the respective connection pipe-stub on opening the lever and/or the snapping-in of the lever and/or the interaction with a shut-off lever.

The heat exchanger 1 includes a damming cover 8 that separates an air space, also called run-off region, around the heat exchanger unit 2 and the run-of pipe-stub 36, with respect to the remaining region of the drain trough 3, and permits a flow of waste water out of this region into a region below the damming cover 8 only through a siphon. The siphon is formed by a siphon wall 81 of the damming cover 8. The waste water must therefore flow through below this siphon wall 81, through a siphon opening 71 between the siphon wall 81 and the damming element 4. The waste water subsequently flows over a distribution element 42, which in this embodiment has a horizontal edge, up to which the waste water flowing through below the siphon wall 81 dams. A distribution surface 75, which connects to the horizontal edge, leads the waste water flowing over the horizontal edge, over the pipe sections 24 of the heat exchanger unit. The waste water collects in the drain trough 3 at the very bottom, and flows through the run-off pipe-stub 36 of the drain trough 3.

The run-off pipe-stub 36, and the region below the damming cover 8 are sealed off with respect to the remaining region of the drain trough 3, for example by way of a peripheral seal 41 between the damming cover 8 and the drain trough 3. By way of this, it is ensured that in normal operation, the waste water from the region below the damming cover 8, after flowing over the pipe sections 24 does not get into the remaining region of the drain trough 3, and waste water from the remaining region of the drain trough 3 only gets to the pipe sections 24 through the siphon opening 71 and via the distribution element 42

The seal 41 between the damming cover 8 and drain trough 3 runs in a continuous manner, firstly along a first, horizontal section 41a along the trough base 33, and then it merges into a second, vertical section 41b along the trough wall 34, a third, horizontal section 41c along the trough wall 34 and a fourth, vertical section along the trough wall 34 back to the first section.

The drain trough 3 can be shaped such that a transition region between the trough wall 34 and the trough base 33 is shaped following a segment of a circle in cross section. The sealing becomes simpler by way of this. Transition regions 41u of the seal 41 between the first and the second as well as between the fourth and the first section of the seal 41 are accordingly formed following at least approximately a sequence of two circular arcs (one vertical, one horizontal) or a segment of an ellipse, in a manner corresponding to the shape of the transition region of the drain trough 3.

The seal 41 forms an odour trap between the run-off pipe-stub 36 and the surroundings of the heat exchanger 1.

The siphon wall 81 in each case can have a different distance to the trough wall 34 at different locations along the heat exchanger unit. A distance of the siphon wall 81 to the damming element 4 can be smaller at the locations, at which the distance of the siphon wall 81 to the trough wall 34 is larger, or vice versa. One can therefore ensure that an object of a prescribed size (for example a ball) can pass the siphon, in accordance with legal stipulations. The object can pass a first section of the siphon that leads downwards, at least in a region, in which the distance between the trough wall 34 and the siphon wall 81 is larger, and it can pass a second section of the siphon that leads upwards again, at least in a region, in which the distance between the damming element 4 and the siphon wall 81 is larger.

Fastening elements and corresponding receivers 56b for the fastening elements can be designed such that they pull the damming cover 8 obliquely against the trough base 33 and trough wall 34, since the damming cover 8 on the one hand is sealed with respect to the wall 34, and on the other hand with respect to the trough base 33. Oblique receivers 56 for fastening elements can be applied as is represented in FIGS. 16a-16b. Screws or bayonet closures can be inserted into these or other receivers. These can include levers that project in the non-locked condition and inhibit a closure of the cover 5.

FIGS. 19a-19b show a heat exchanger unit 2, in which the pipe sections 24 are bent. The pipe sections 24 in each case follow a segment of a circle. The connection pieces 21, 22 are designed in a separate manner, but in another embodiment can also be designed in a combined manner as a single connection piece, in which all deflection elements are realised. Deflection elements that lead the fresh water conduit (seen from above) further in essentially the same direction, but onto a different plane, can also be present instead of deflection elements that realise a defection about 180°. For this, these deflection elements can have an S-shaped course within the connection piece 21. As already described in the context of the other embodiments of connection pieces, this connection piece 21 can also be realised in a single-walled or double-walled manner and be realised of different materials or material combinations.

In other embodiments, in which the run-off pipe-stub 36 is drawn leading away in a horizontal manner, it can also lead away through the trough base 33 in a vertical manner or through the trough base 33 and/or trough wall 34 in a diagonal manner. Several run-off pipe-stubs can be present.

FIG. 20 in the middle and on the right side shows horizontal pipe sections 24 that are arranged above one another and offset to one another in the horizontal direction. A reduced construction height compared to the arrangement on the left side (in which the pipe sections lie essentially vertically above one another) can be achieved by way of this. A good flow over the pipe sections 24 however is ensured in spite of this, by way of a running-down film of water spreading over both sides of the pipe sections 24 due to adhesion and cohesion.

The pipe sections 24 in the arrangement on the right side of FIG. 20 are subjected to throughflow one after the other seen along the vertical direction. In the example, the pipe sections 24 form a series with three and an offset series with two pipe sections. The pipe sections in one of these series lie essentially vertical above one another. Four and three or five and four pipe sections 24 can also be present in the two series, or the same number of pipe sections in both series. Such arrangements with offset series of pipe sections 24 for example can be applied in the embodiments of FIGS. 17 to 19. Thereby, the distribution element 42 after the overflow can include a series of distribution openings 43 in the distribution surface 75, wherein the distribution openings 43 are arranged above the one series of pipe sections 24, and a run-off edge is arranged above the other series of pipe sections 24. Further series of pipe sections can also be present in an analogous manner.

FIG. 21 shows a cleaning appliance 85 for cleaning several pipe sections 24 lying over one another. The cleaning appliance 85 includes two arms 86 which, departing from a base element or holding element 87, extend essentially parallel to one another in the same direction. The arms can be attached onto a set of pipe sections 24, so that they enclose these. The arms 86 can have a spring effect and be removed from the pipe sections 24 by way of bending open slightly, and are thus exchangeable. The arms 86 can be designed with mechanical cleaning elements, for example brushes or scrapers or a strip of a rough material. They can be manually pushed along the set of pipe sections 24 and mechanically clean the pipe sections 24 by way of this. A cleaning agent can be deposited on inner surfaces of the cleaning appliance 85 that are in contact with the pipe sections 24, and/or the cleaning elements can be impregnated or soaked by cleaning agent. A storage element with a supply of cleaning agent can also be present, and this cleaning agent flows to the cleaning elements due to the capillary effect for example. The cleaning appliance can be exchanged in the case that the cleaning agent is consumed. The holding element 87 here is drawn vertically, but it can also run horizontally or diagonally, and includes a grip or anatomically shaped section for manual actuation. The cleaning appliance 85 can also serve for spacing the pipe sections 24 on transport and/or in operation of the heat exchanger.

Figure 22:
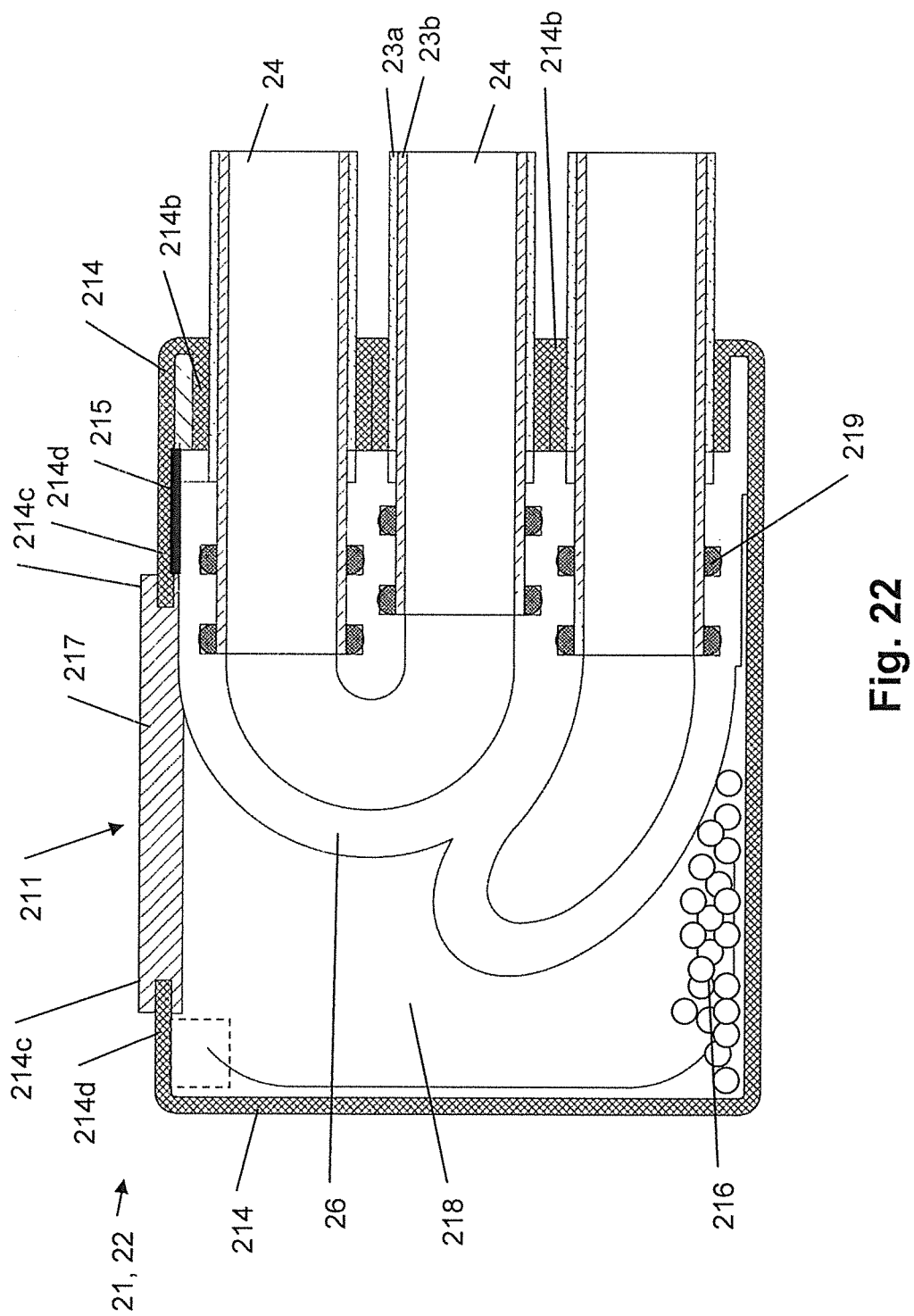
FIG. 22 a connection piece with a sheath.

FIG. 22 shows a connection piece 21, 31, for example of metal, with a sheath 214 of an elastic plastic. Pipe sections 24 are inserted into the connection piece 21, 32, with a first inner separation between regions leading fresh water and regions of the heat exchanger 1 that leads waste water, wherein these regions are sealed off by O-rings 219. The sheath 214 forms a second outer separation. The sheath 214 in FIG. 23, in individual regions bears tightly on the connection piece 21, 31 and in other regions is distanced to this. The connection piece 21, 31, for example in a region next to deflection elements 26 and the feed and discharge, includes a flange region 218 with which the connection piece 21, 31 is assembled on the respective connection pipe-stub 31. The sheath 214 forms a cap and a cavity next to this flange region 218. The sheath can include a viewing opening 211 with a closure 217. The closure 217 can be manufactured of a transparent material.

The sheath 214 can form one or more different sealing regions:
- a first sealing region between the connection piece 21, 31 and the trough wall 34;
- a second sealing region 214b between the connection piece 21, 31 and a pipe section 24 inserted into this;
- a third sealing region 214c between the connection piece 21, 31 and a closure 217 of a viewing opening 211, which is inserted into the connection piece 21, 31; and/or
- a fourth sealing region 214d between the connection piece 21, 31 and a cover which lies on the connection piece 21, 31, in particular a damming cover 8, wherein an opening of the cover is present and the opening is sealed with respect to a region about the connection piece, by way of this sealing region. In the case that the fourth sealing region 214d, which is drawn in FIG. 22 at the left of the viewing opening 211, is used, it is supported on a part of the connection piece 21, 32, which is drawn in a dashed manner, and can be pressed against this.

A material 215 that changes its colour when absorbing water can be incorporated in the intermediate region between the sheath 214 and the connection piece. If the sheath is transparent or semi-transparent, the colour of the material 215 is visible through the sheath 214 and the presence of fluid and thus of leak can be optically recognised.

Alternatively or additionally, one or more floats 216 as display bodies can be present in the intermediate region. These are lighter than water and are displaced upwards, if leakage water is present in the intermediate region. The float body 216 can be a granulate or a quantity of small balls or other bodies. However, also a single float can be present. Common to all these, is the fact that they float upwards given the occurrence of leakage water and become visible through the viewing opening 21 or through a transparent sheath 214, and thus indicate the presence of a leak.

FIG. 23 shows a drain trough 3 with a discharge valve 9 of a shower, which is arranged therein. The drain trough 3 captures the waste water from the respective shower tray, and the heat exchanger 1 arranged in the drain trough 3 thereby heats the fresh water for use in the shower. The discharge valve 9 permits a conduit 92 to the shower 92 to be emptied, when the shower is not in operation. The emptying can be effected automatically, for example when the flow of fresh water is switched off or without pressure. The emptying of the conduit 92 is effected into the drain trough 3 through an emptying pipe-stub 91 for example. The discharge valve 9 can be arranged between the fresh water discharge 39 of the heat exchanger 1, and the conduit 92 to the shower. The discharge valve 9 can alternatively be arranged between an outer fresh water feed 90 to the heat exchanger 1 and the fresh water feed 38 of the heat exchanger 1 (drawn in a dashed manner).

FIG. 24 apart from the already mentioned elements such as a heat exchanger 1 can be integrated into an existing installation. Thereby, an extension unit 92 is applied, and this is connected to existing cold water and warm water connections 93. The extension unit 94 can be assembled on an existing wall, so that the wall does not need to be broken open for laying the conduits. The fresh water feed 90 from the cold water connection is led within the extension unit 94 at least partly to the heat exchanger 1, and the conduit 91 at least partly is led from the heat exchanger 1 to the shower or to a mixer 95. The mixer 95 can mix the water from the fresh water discharge 39 of the heat exchanger 1 with water from the warm water connection.

In an embodiment, the extension unit 94 covers those conduit sections to and from the heat exchanger, which run vertically along a wall, or contains these. The extension unit 94 can cover the existing cold and warm water connections 93. The extension unit 94 can cover or contain the mixer 95 and at least a section of a conduit to the shower or to another outlet.

In an embodiment, only one cold water connection is present, and the extension unit includes a local water heating device, in particular an electrical water heating device.

In an embodiment, the extension unit includes measuring means, in particular a temperature and flow measurement means, with which a consumption of water and/or energy as well as an efficiency of the heat exchanger can be determined and optically displayed to a user.

FIG. 25 shows an embodiment of a sealing arrangement, in which the peripheral seal 41 runs between the damming cover 8 and the drain trough 3, in or along a plane. A particularly reliable sealing can be realised by way of this. A plane, along which the seal 41 runs, is inclined at an angle of between 30° and 80° for example, and in particular of about 60°, to the horizontal (in the installed condition of the heat exchanger). The seal 41 likewise lies on a surface of the drain trough 3 which runs in this plane This surface can be designed as a shoulder or sealing shoulder 47 on the trough base 33 and on one of the trough walls 34. The surface (drawn in a dashed manner) in a transition region between these two can be formed on face-side trough walls or departing from the face-side trough walls can extent to the inside of the drain trough.

FIG. 26 shows different shapes of seals, from the top to the bottom:
- a seal with a U-profile. Such a seal is also shown in FIGS. 18a and 18c. The seal is stuck onto the edge of a sheet-metal piece, by way of a slot. A pressing force for sealing, with this seal runs within the plane of a sheet-metal piece, onto whose edge the seal is stuck.
- a seal with an e-profile. The seal is stuck onto the edge of a sheet-metal piece by way of a slot. A pressing force for sealing, with this seal runs perpendicularly to the plane of a sheet-metal piece, onto whose edge the seal is stuck. This shape of the seal has the advantage that a curved course of the seal in a plane can be realised in a simpler manner by way of the course of the edge of the sheet-metal piece. This is possible in a simple and precise manner by way of laser cutting for example. Such a course in the case of a seal with an O-profile must be realised by way of bending the sheet-metal piece, which is more difficult.

a foamed seal in a single-layered and in a multi-layered variant. A pressing force for sealing, with this seal runs perpendicularly to the plane of a sheet-metal piece, onto which the seal is deposited which is to say foamed. The seal can be of polyurethane or silicone and be injected on, in particular as a formed in place gasket (FIPFG). Tight bending radii and a compact construction manner can be realised with this.

Figure 27:
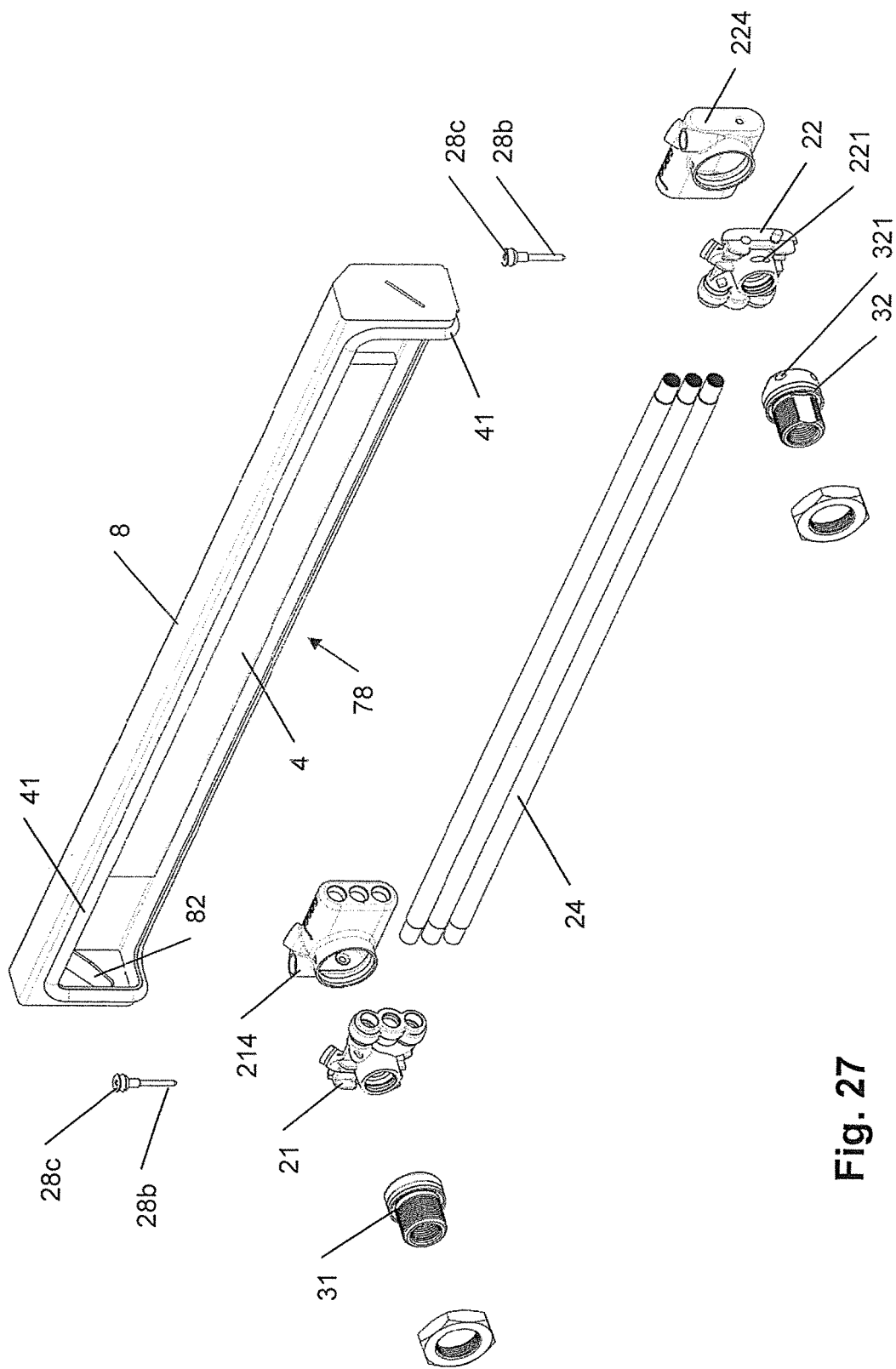
FIG. 27 a further embodiment of a heat exchanger unit, and for this, a further embodiment of a damming cover.

FIG. 27 shows a further embodiment of a heat exchanger unit 2, by way of an exploded drawing, with a first connection piece 21 and second connection piece 22, which can be releasably assembled on a first and second connection pipe-stub 31, 32 respectively, as well as several pipe sections 24, which in particular can be double-walled. Bolts or pins 28b are provided as fixation elements for the assembly. For fixation, these can be pushed through a bore or indentation 221 in a connection piece 21, 22, and a corresponding bore 321 in the respective connection pipe-stub 31, 32, similarly as is the case with the embodiment according to FIG. 18a.

The connection pieces 21, 22 can be enveloped by a first sheath 214 and a second sheath 224 respectively, which as in the embodiment of FIG. 22 forms a second separation between fresh water and waste water. A cap 28c serves for the closure of a viewing opening 211 of the respective sheath.

The heat exchanger unit 2 as in the embodiments of FIGS. 15 to 18 can be assembled in a drain trough. Thereby, analogously to the embodiment of FIG. 18, it can be covered by a damming cover 8 which separates a region around the heat exchanger units 2 from the remaining regions of the drain trough 3 and seals it by way of a seal 41.

FIGS. 28a-28d show details of a damming cover 8 of FIG. 27, wherein this damming cover can also be combined with an embodiment of heat exchanger unit 2 other than that of FIG. 27. The damming cover 8 comprises essentially the same functional elements as that of FIG. 18, in particular siphon wall 81, siphon opening 71, damming element 4 and distribution element 42. The damming cover 8 and in particular the mentioned elements can thereby be formed from a single sheet-metal piece by way of bending operations, and without deep-drawing operations. FIG. 28a shows a view from below and FIG. 28b a view from the run-in region E, thus with a view towards the siphon wall 81. FIGS. 28c and 28d show cross sections A-A and B-B according to FIG. 28b. A run-off opening 78 is visible apart from the already mentioned elements. This is the opening below the damming cover 8 towards the run-off pipe-stub 36. The seal 41, along an edge of the run-off opening 78 can be arranged for sealing the damming cover 8 with respect to the drain trough 3 (only shown in FIG. 27). Holes 83 for receiving fastening elements, for example for a bayonet connections or screw connections, for fasting the damming cover on the connection pieces 21, 22, are arranged at an upper side of the damming cover 8. Guide elements or guide plates 82 are arranged at face-side side walls of the damming cover 8. These abut on corresponding guide projections 82b of the connection pieces 21, 22, and by way of this stabilise the position of the damming cover and even out a pressing force of the seal 41 along its course.

FIGS. 29a-29b show a connection piece 21 of the heat exchanger unit of FIG. 27. Most elements are designed analogously to those of FIGS. 16 and 22. What is to be distinguished is the receiver 56b for fastening elements 56 for fastening a damming element, a damming trough or a damming cover, corresponding to FIG. 16, and the sheath 214 for forming a second, outer separation between the fresh water and waste water corresponding to FIG. 22.

In contrast, what is different is the fixation of the connection piece 21 on the connection pipe-stub 31, and the control or viewing opening as well as disassembly elements 220.

FIGS. 30a-30b show cross sections through a connection piece 21 and a connection pipe-stub 31 of FIG. 29, with a damming cover 98 assembled on the connection piece. The drain trough 3 is yet also drawn in FIG. 30a. It is evident in FIG. 30a as to how the damming cover is fastened on the receiver 56b of the connection piece 21, by way of a fastening element 56, here a bayonet closure. The peripheral seal 41 is pressed against the trough wall 34 and the trough base 33 by way of this, and seals the run-off region A with respect to the run-in region E. The fixation of the connection piece 21 on the connection pipe-stub 31 by way of a fixation element is evident in FIG. 30b. The already mentioned bolts or pins 28b as fixations elements can be shaped in a stepped manner as shown in FIG. 16d, so that they can only be (in particularly simply) removed when the fresh water conduit is not under pressure. The cap 28c closes the same opening or viewing opening 211, through which the fixation elements can be assembled and disassembled. The cap 28c moreover permits a control as to whether water is located in the intermediate space 212 of the connection piece 21. The cap 28c can be held on the fixation element 28b or on the sheath 214 or on both, in a manner such that it can be stuck on and removed. The cap 28c and the fixation element 28 in the figures are represented formed as a single part.

The sheath 214 alternatively or additionally can include a valve which opens given overpressure and at which water present in the intermediate space 212 can exit. The valve can be formed as part of the sheath 214, for example as a duck bill valve.

FIGS. 31a-31b show disassembly elements and their use. The disassembly elements are realised by way of formations 220 on the connection piece 21 and/or formations 320 on the connection pipe-stub 31, between which a tool 330 can be inserted, with which tool the connection piece 21 and the connection pipe-stub 31 can be pressed away from one another. This is a screwdriver by way of example in the figures. An intermediate space between the connection piece 21 and connection pipe-stub 31 and which is formed by the mentioned formations 220, 320, in the assembled condition of the heat exchanger unit on the one hand has a defined minimal size or opening width and on the other hand a defined abutment or depth. The tool can be reliably inserted and actuated without damage to the parts by way of this. The minimal size or opening width for example is 5 mm*3 mm, the depth at least 5 mm. FIG. 31a shows a sequence with the following disassembly steps:

removing the cap 28c from the viewing opening 211. Optionally, control as to whether water is present in the intermediate space. Simultaneously with the removable of the cap 28c (with a single-part design) or subsequently to this, removing the fixation element 28b.

introducing a tool 330 through the viewing opening 211 and actuating, in particular rotating the tool between the connection piece 21 and the connection pipe-stub 31, for pushing these part, in particular by way of the tool being led between the formations (projections) 220, 320 and pressed against the formations for pushing apart.

FIG. 31b shows a mutual position of the connection piece 21 and connection pipe-stub 31 while omitting the sheath 214, so that the mutual position of the formations 220, 320 becomes visible. See also FIG. 30a for this.

The invention claimed is:

1. A heat exchanger for heating fresh water by way of heat from waste water, at a shower or bath tub, comprising:
a drain trough,
at least one heat exchanger unit which is arranged in the drain trough and is provided for the connection into a fresh water feed, and
a distribution element which is arranged for distributing running-off water over the at least one heat exchanger unit,
wherein the at least one heat exchanger unit comprises several sequentially successive pipe sections which are connected to one another by deflection sections and which run essentially horizontally, given an orientation of the heat exchanger as in operation of the heat exchanger, wherein in each case, two horizontally running, successive pipe sections, thus ones which are connected to one another by a deflection section, are arranged above one another, and one after the other are subjected to being sprinkled or flowed over by dripping down or running down waste water, and
further comprising a double-walled separation between regions leading fresh water and regions leading waste water, by way of an intermediate space, wherein the pipe sections are formed by double-wall pipes, and wherein
a connection unit is present, wherein an inner region of the connection unit is separated from waste-water-leading regions in a fluid-tight manner, and conduits leading fresh water, in particular pipes and/or reinforced hoses, are arranged in the inner region of the connection unit in a single-walled manner, and the inner region is connected to an intermediate space of the double-wall pipes.

2. The heat exchanger according to claim 1, wherein the pipe sections are arranged vertically above one another.

3. The heat exchanger according to claim 2, wherein the pipe sections are essentially straight.

4. The heat exchanger according to claim 1, wherein the at least one heat exchanger unit comprises a double separation with an intermediate space between the fresh water and waste water, wherein the intermediate space is located completely within the drain trough.

5. The heat exchanger according to claim 1,
comprising movable connections that permit a pivoting-out or removal of the at least one heat exchanger unit from the drain trough.

6. The heat exchanger according to claim 1, wherein the heat exchanger unit is connected to a first connection piece for feeding fresh water and to a second connection piece for the discharge of fresh water, and the drain trough comprises a first and a second connection pipe-stub which respectively lead into and out of the drain trough, and the first connection piece is releasably assembled on the first connection pipe-stub, and the second connection piece is releasably assembled on the section connection pipe-stub.

7. The heat exchanger according to claim 1, comprising a double-walled separation between regions leading fresh water and regions leading waste water, by way of an intermediate space, wherein the pipe sections are formed by double-wall pipes, and wherein
double-walled connection pieces and optionally also double-walled connection pipe-stubs are present, and an intermediate space of the connection pieces is connected to an intermediate space of the double-wall pipes.

8. A heat exchanger for heating fresh water by way of heat from waste water, at a shower or bath tub, comprising:
a drain trough,
at least one heat exchanger unit which is arranged in the drain trough and is provided for the connection into a fresh water feed, and
a distribution element which is arranged for distributing running-off water over the at least one heat exchanger unit,
wherein the at least one heat exchanger unit comprises several sequentially successive pipe sections which are connected to one another by deflection sections and which run essentially horizontally, given an orientation of the heat exchanger as in operation of the heat exchanger, wherein in each case, two horizontally running, successive pipe sections, thus ones which are connected to one another by a deflection section, are arranged above one another, and one after the other are subjected to being sprinkled or flowed over by dripping down or running down waste water, and
wherein connecting pieces or connection pieces are present, which each comprise one or more deflection sections in the form of deflection elements, wherein a deflection element corresponds to a conduit section with a deflection by 180° and the two ends of such a conduit section are connected in each case to a pipe section.

9. The heat exchanger according to claim 8, wherein at least one of the connection pieces comprises a sheath of an, in particular elastic, plastic, which covers at least a part of the connection piece and forms a second separation between regions of the heat exchanger leading fresh water and regions of the heat exchanger leading waste water.

10. The heat exchanger according to claim 9, wherein a region of the sheath forms a sealing region between the connection piece and the drain trough, in particular a trough wall or the trough base.

11. The heat exchanger according to claim 9, wherein a region of the sheath forms a sealing region between the connection piece and a pipe section inserted into this connection piece.

12. The heat exchanger according to claim 9, wherein a region of the sheath forms a sealing region between the connection piece and a closure of a viewing opening which is inserted into the connection piece.

13. The heat exchanger according to claim 9, wherein a region of the sheath forms a sealing region between the connection piece and a cover lying on the connection piece, in particular a damming cover, wherein an opening is present in the cover and by way of this sealing region the opening is sealed with respect to a region around the connection piece.

14. The heat exchanger according to claim 9, wherein a material is incorporated in an intermediate region between the sheath and the connection piece, and this material changes its colour on absorbing water, and wherein the sheath is transparent or semi-transparent.

15. A heat exchanger for heating fresh water by way of heat from waste water, at a shower or bath tub, comprising:
a drain trough,
at least one heat exchanger unit which is arranged in the drain trough and is provided for the connection into a fresh water feed, and
a distribution element which is arranged for distributing running-off water over the at least one heat exchanger unit, wherein the at least one heat exchanger unit comprises several sequentially successive pipe sections which are connected to one another by deflection sections and which run essentially horizontally, given an orientation of the heat exchanger as in operation of the heat exchanger, wherein in each case, two horizontally running, successive pipe sections, thus ones which are connected to one another by a deflection section, are arranged above one another, and one after the other are subjected to being sprinkled or flowed over by dripping down or running down waste water, and wherein a run-in region, a siphon region and a run-off region are arranged in the drain trough, through which regions waste water flows one after the other and in this sequence, on operation of the heat exchanger, wherein the run-in region is in air exchange with the surroundings above the heat exchanger, the run-off region is in air exchange with a run-off pipe-stub provided for connection to a sewage system, and the siphon region prevents air exchange between the run-in region and run-off region and permits the flow of fluid from the run-in region to the run-off region, the siphon region at a first side is delimited by a trough wall and at a second side by a damming element, the damming element holds back running-off waste water, so that it flows over a distribution element which distributes the waste water over the at least one heat exchanger unit.

16. The heat exchanger according to claim 15, wherein the siphon region considered along a horizontal direction is arranged at a first side of the heat exchanger unit, and the run-off region is arranged at a second side of the heat exchanger unit which is opposite to the first side.

17. The heat exchanger according to claim 16, wherein the fresh water feed and a fresh water discharge of the heat exchanger unit are led through a trough wall at the second side of the heat exchanger unit.

18. The heat exchanger unit according to claim 15, wherein all the pipe sections of the heat exchanger unit are arranged above one another and dripping-down or running-down waste water trickles or flows over one after the other.

19. The heat exchanger unit according to claim 15, wherein the siphon region is sealed with respect to the run-off region by way of a seal which is arranged between the trough base and the damming element.

20. The heat exchanger unit according to claim 15, wherein the run-in region is sealed with respect to the run-off region by a seal which is arranged between the trough wall and a damming cover, wherein the damming cover prevents air from getting from the run-off region into the run-in region, and in particular the seal is formed as one piece with a seal for sealing with respect to the trough base.

21. The heat exchanger according to claim 15, wherein the siphon region is sealed with respect to the run-off region by way of a seal which is arranged between the trough base and the damming element, and wherein the run-in region is sealed with respect to the run-off region by a seal which is arranged between the trough wall and a damming cover, wherein the damming cover prevents air from getting from the run-off region into the run-in region, and in particular the seal is formed as one piece with a seal for sealing with respect to the trough base, wherein the seal between the damming cover and the drain trough runs in or along a plane, and this plane is inclined with respect to the horizontal, in particular by an angle between 30° and 80°.

* * * * *